US012699016B2

(12) United States Patent
Woo et al.

(10) Patent No.: US 12,699,016 B2
(45) Date of Patent: Aug. 4, 2026

(54) SENSING DEVICE

(71) Applicant: LG INNOTEK CO., LTD., Seoul (KR)

(72) Inventors: Myung Chul Woo, Seoul (KR); Tae San Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 838 days.

(21) Appl. No.: 17/788,006

(22) PCT Filed: Dec. 18, 2020

(86) PCT No.: PCT/KR2020/018672
§ 371 (c)(1),
(2) Date: Jun. 22, 2022

(87) PCT Pub. No.: WO2021/132999
PCT Pub. Date: Jul. 1, 2021

(65) Prior Publication Data
US 2023/0038153 A1    Feb. 9, 2023

(30) Foreign Application Priority Data

Dec. 23, 2019    (KR) ........................ 10-2019-0173175
Jan. 8, 2020    (KR) ........................ 10-2020-0002744

(51) Int. Cl.
*B62K 25/30*        (2006.01)
*B62K 3/02*        (2006.01)
(Continued)

(52) U.S. Cl.
CPC .............. *G01L 3/104* (2013.01); *G01L 5/221* (2013.01); *B62D 15/0235* (2013.01)

(58) Field of Classification Search
CPC ....... G01L 3/104; G01L 5/221; G01L 19/148; B62D 15/0235; B62D 6/10; B62D 15/02
(Continued)

(56) References Cited

U.S. PATENT DOCUMENTS 8,390,276 B2 *  3/2013  McDonald ............. G01D 5/145
                                                          324/207.25
9,321,172 B2 *  4/2016  Johnson ................. H02K 11/25
                (Continued)

FOREIGN PATENT DOCUMENTS

JP        2015-184220        10/2015
JP        2015184220 A   * 10/2015   ............... B62D 5/04
                (Continued)

OTHER PUBLICATIONS

International Search Report dated Mar. 9, 2021 issued in Application No. PCT/KR2020/018672.

*Primary Examiner* — Vivek D Koppikar
*Assistant Examiner* — Nabin Kumar Sharma
(74) *Attorney, Agent, or Firm* — KED & ASSOCIATES, LLP

(57)        ABSTRACT

Provided in one embodiment is a sensing device comprising a stator including a stator tooth, and a rotor including a magnet, wherein the stator tooth includes a first stator tooth and a second stator tooth arranged in the first stator tooth, the first stator tooth includes a plurality of first teeth, second stator tooth includes a plurality of second teeth, and the first teeth overlap with the second teeth in the radial direction from the center of the stator, the sensing device further comprising a first sensor and a collector arranged between the first stator tooth and the second stator tooth in the radial direction, wherein the collector includes a first collector and a second collector arranged in the first collector, the first sensor is arranged between the ring-shaped first collector and the ring-shaped second collector in the radial direction, the first collector and the second collector respectively include a body arranged to face the first sensor, and an extending part that extends from the body, the extending part includes a protrusion part protruding from one side edge of (Continued)

the extending part in the axial direction, and the protrusion part includes areas that differ in width in the circumferential direction.

12 Claims, 50 Drawing Sheets

(51) Int. Cl.

| | | |
|---|---|---|
| *B62K 25/04* | (2006.01) |
| *G01L 3/10* | (2006.01) |
| *G01L 5/22* | (2006.01) |
| *B62D 15/02* | (2006.01) |

(58) Field of Classification Search

USPC ........................................................ 180/444

See application file for complete search history.

(56)  References Cited

U.S. PATENT DOCUMENTS

| | | | | |
|---|---|---|---|---|
| 2010/0319466 | A1* | 12/2010 | Bae .......................... | G01L 3/104 |
| | | | | 73/862.325 |
| 2012/0074808 | A1 | 3/2012 | Mcdonald et al. | |
| 2013/0133437 | A1* | 5/2013 | Woo .......................... | G01L 3/104 |
| | | | | 73/862.335 |
| 2016/0016607 | A1* | 1/2016 | Yoshida ............... | B62D 5/0421 |
| | | | | 324/207.2 |
| 2018/0340853 | A1* | 11/2018 | Berner ..................... | B62D 6/10 |
| 2023/0038153 | A1* | 2/2023 | Woo .......................... | G01L 3/104 |

FOREIGN PATENT DOCUMENTS

| | | | | |
|---|---|---|---|---|
| KR | 10-1233888 | 2/2013 | | |
| KR | 20160029990 A | * | 3/2016 | ............. G01L 3/101 |
| KR | 10-2019-0028123 | 3/2019 | | |
| WO | WO-2019022325 A1 | * | 1/2019 | ............... B62D 6/10 |

* cited by examiner

【FIG. 1】
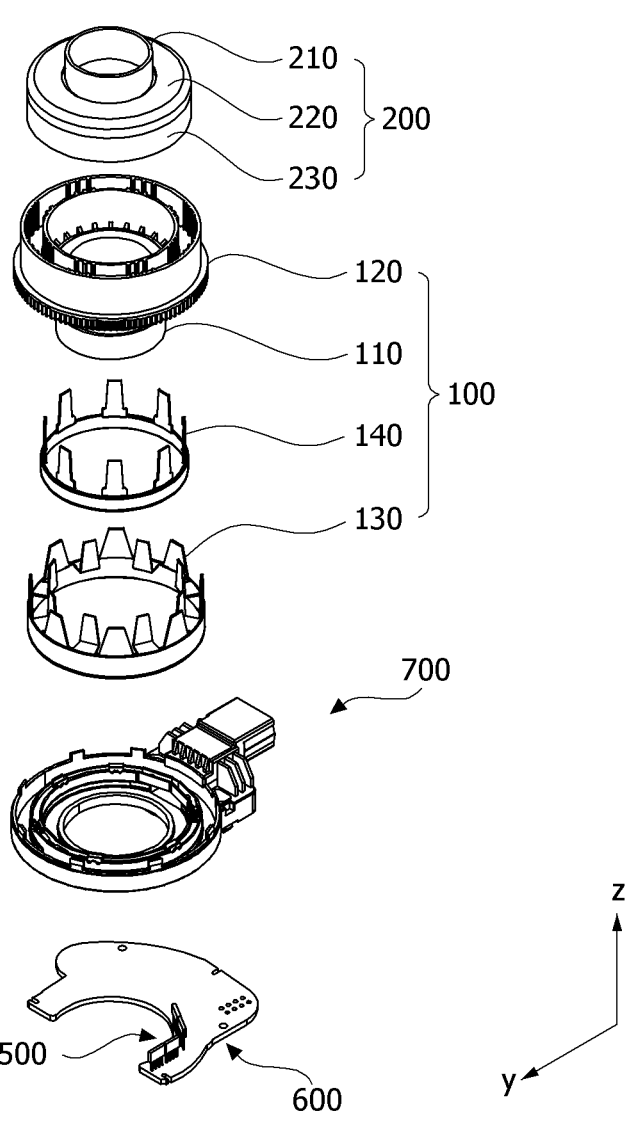

【FIG. 2】
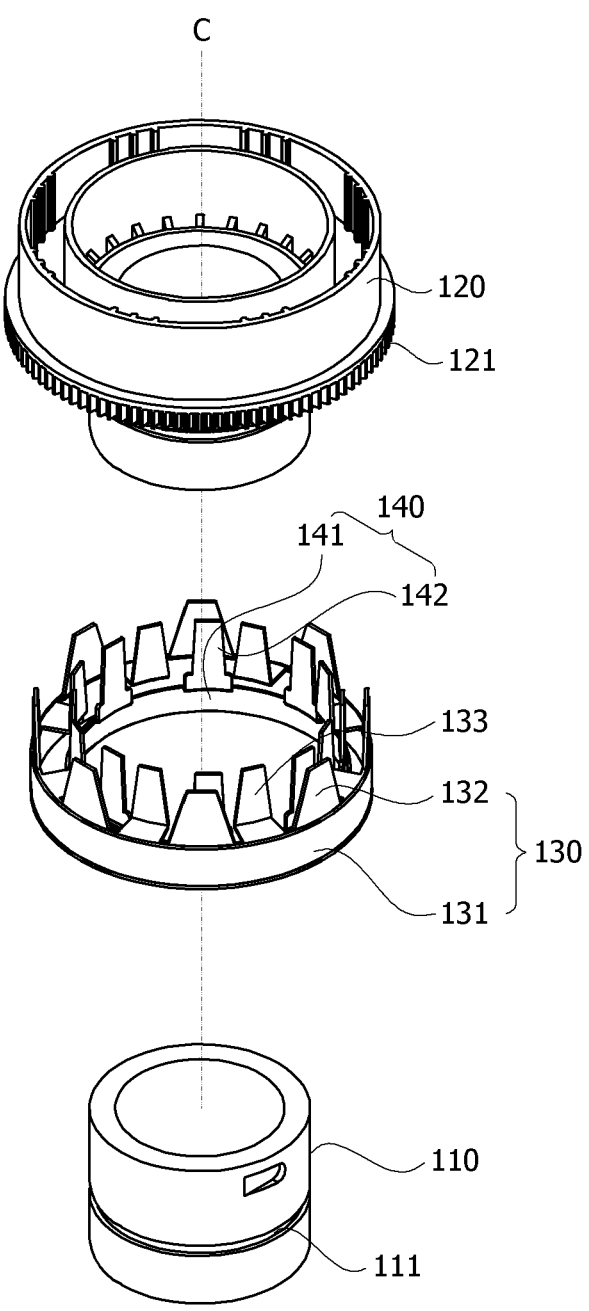

[FIG. 3]
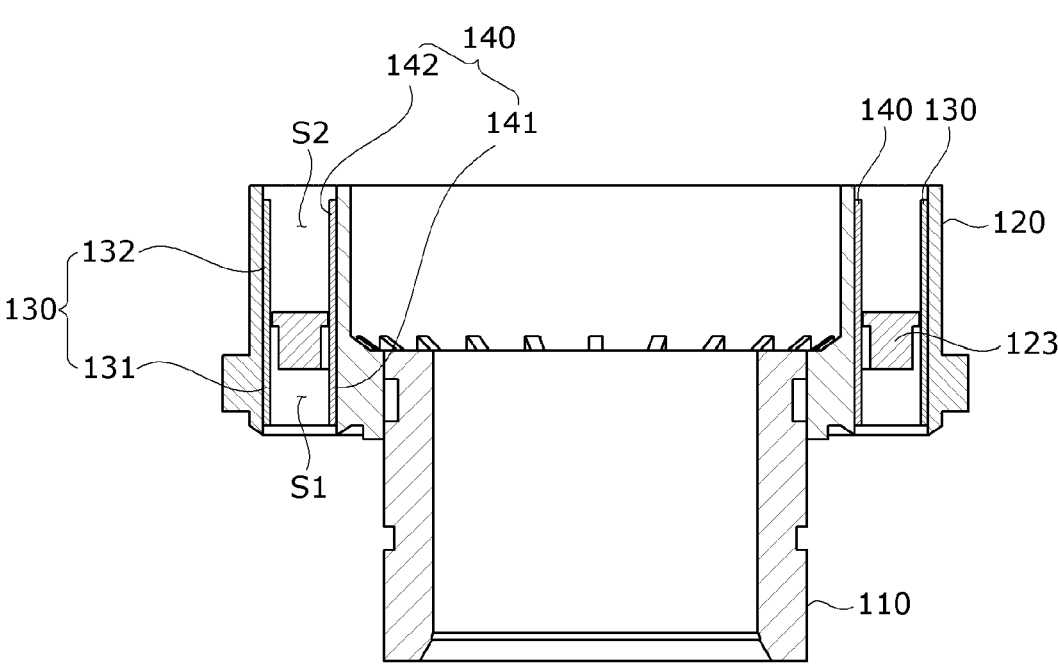

【FIG. 4】
120
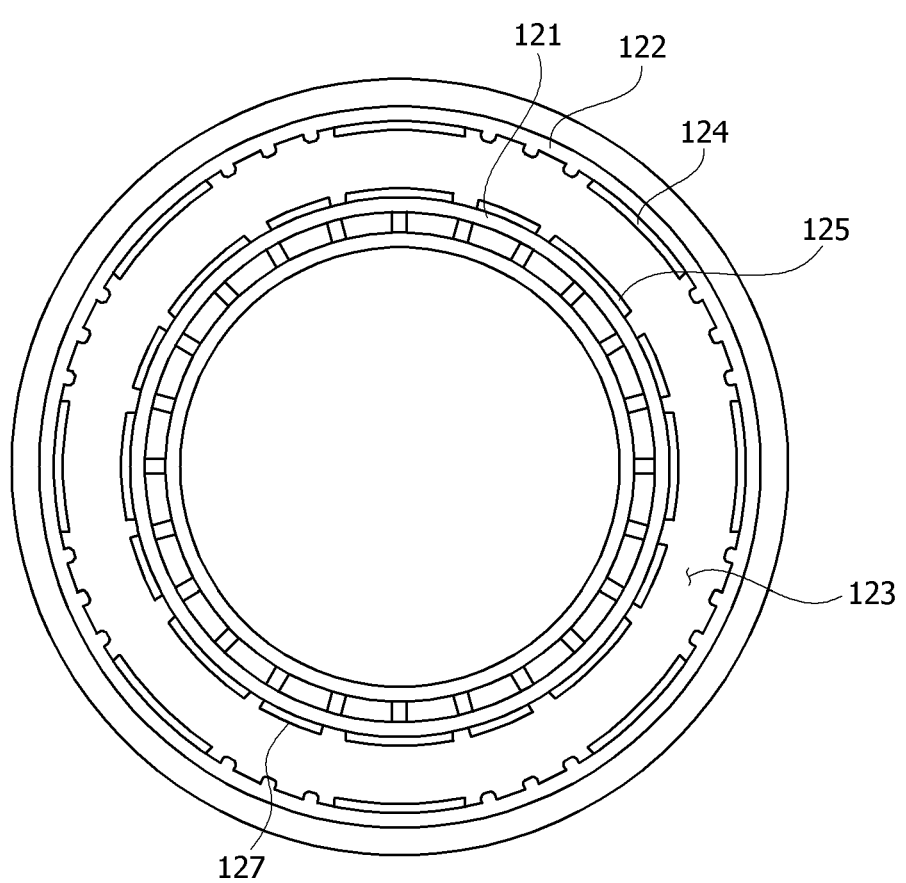

【FIG. 5】
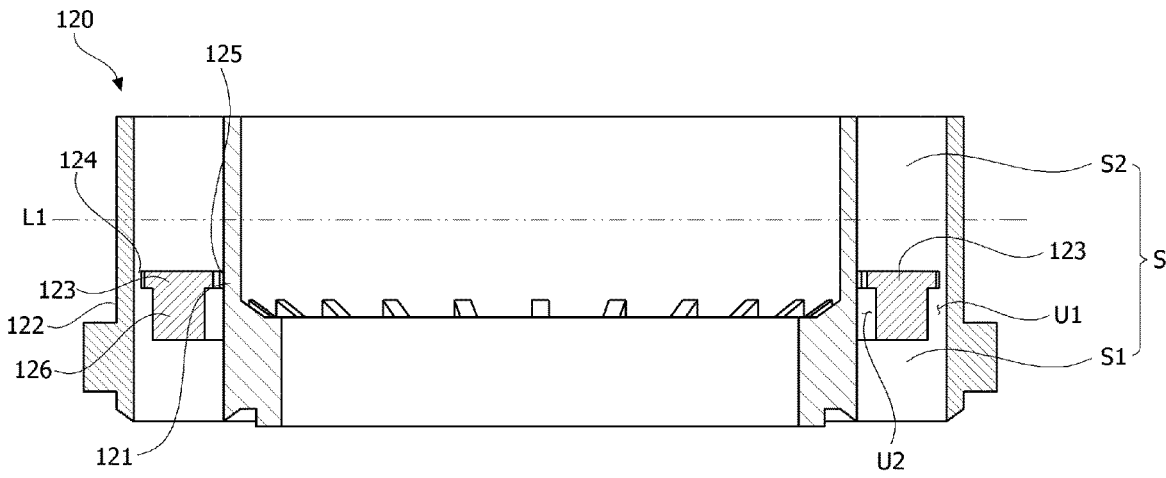

【FIG. 6】
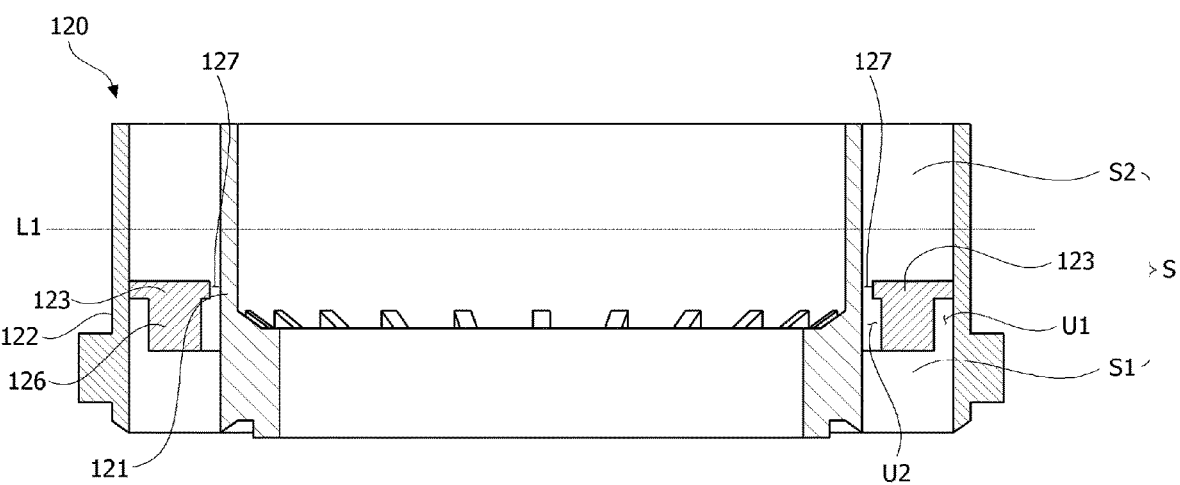

【FIG. 7】
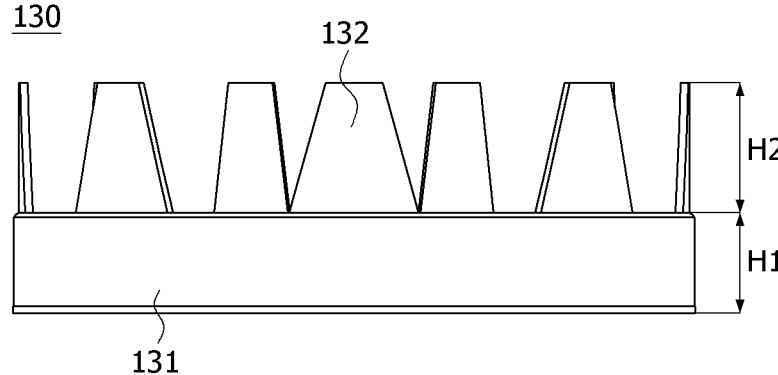

【FIG. 8】
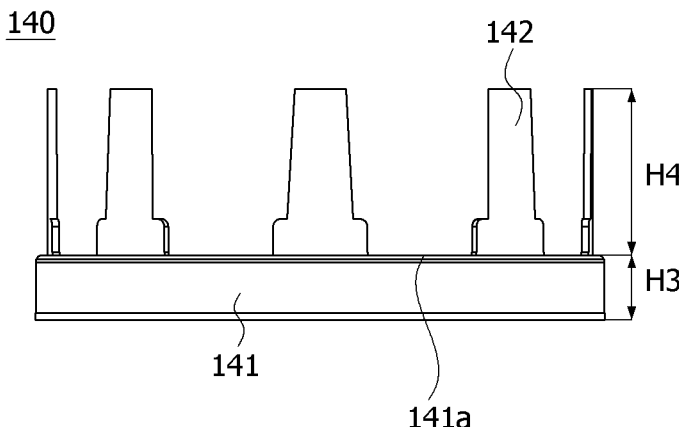

【FIG. 9】
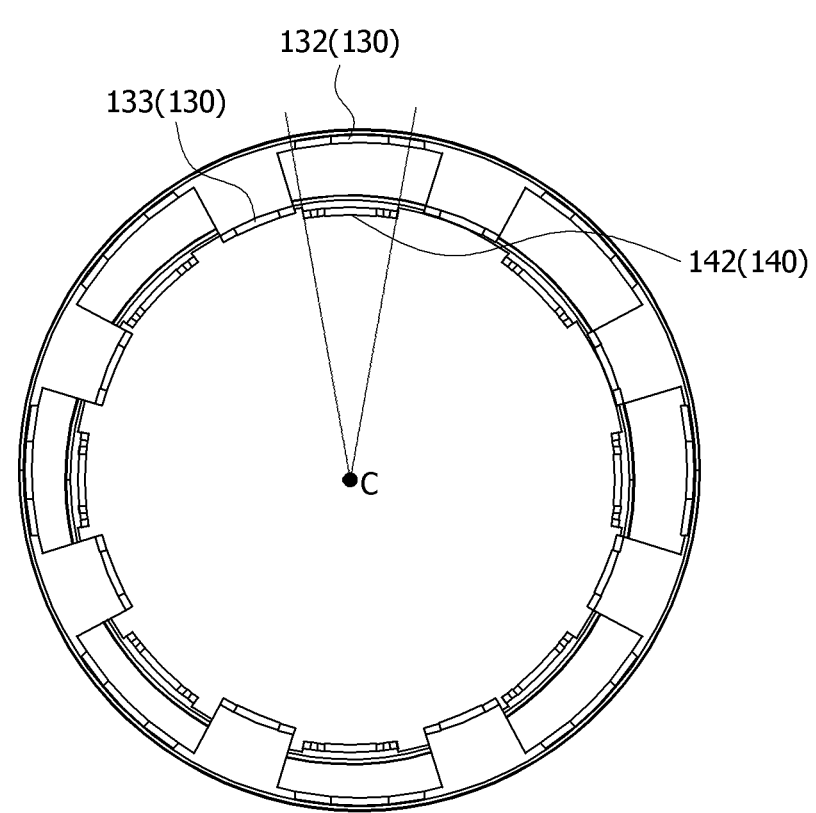

【FIG. 10】
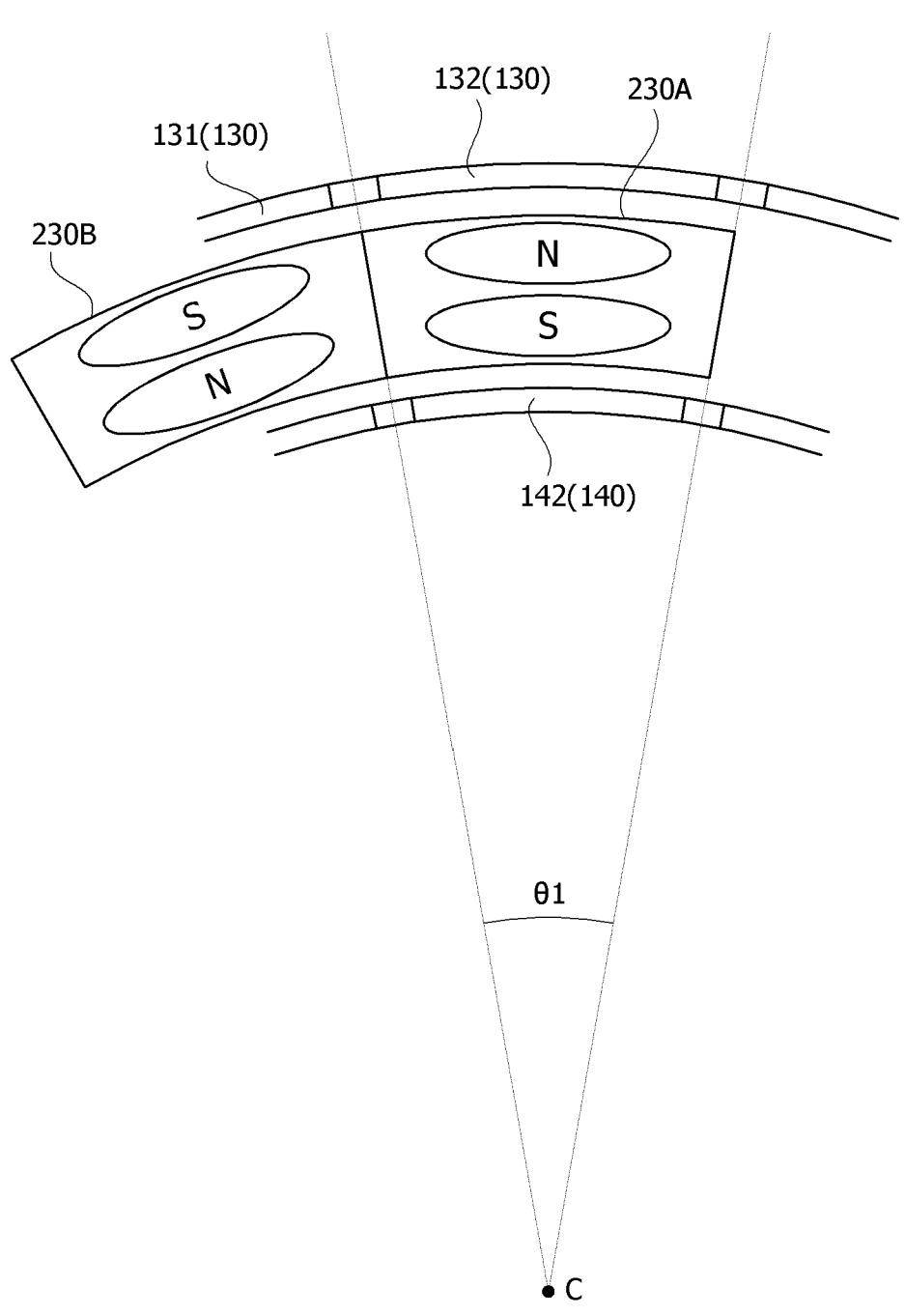

【FIG. 11】
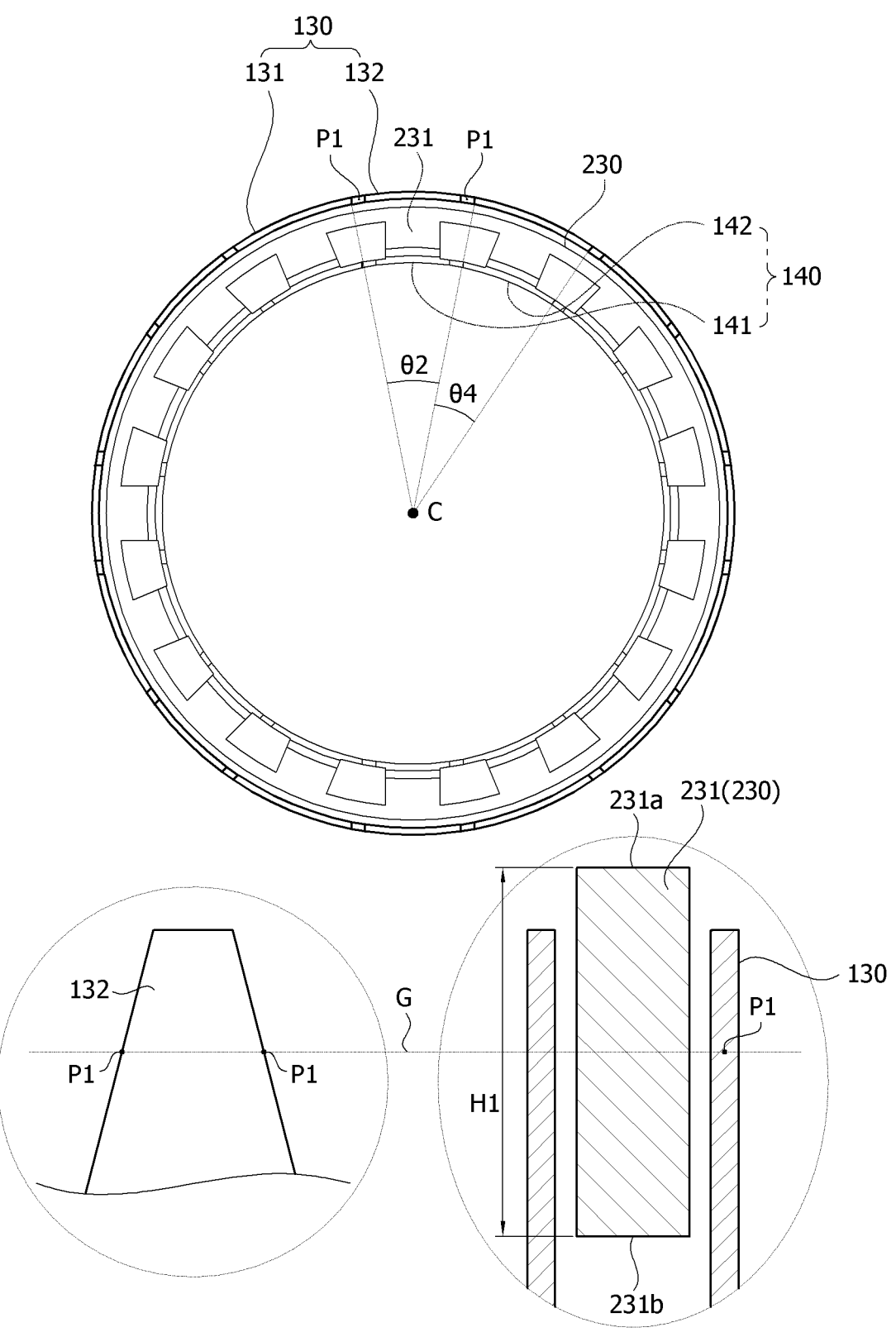

【FIG. 12】
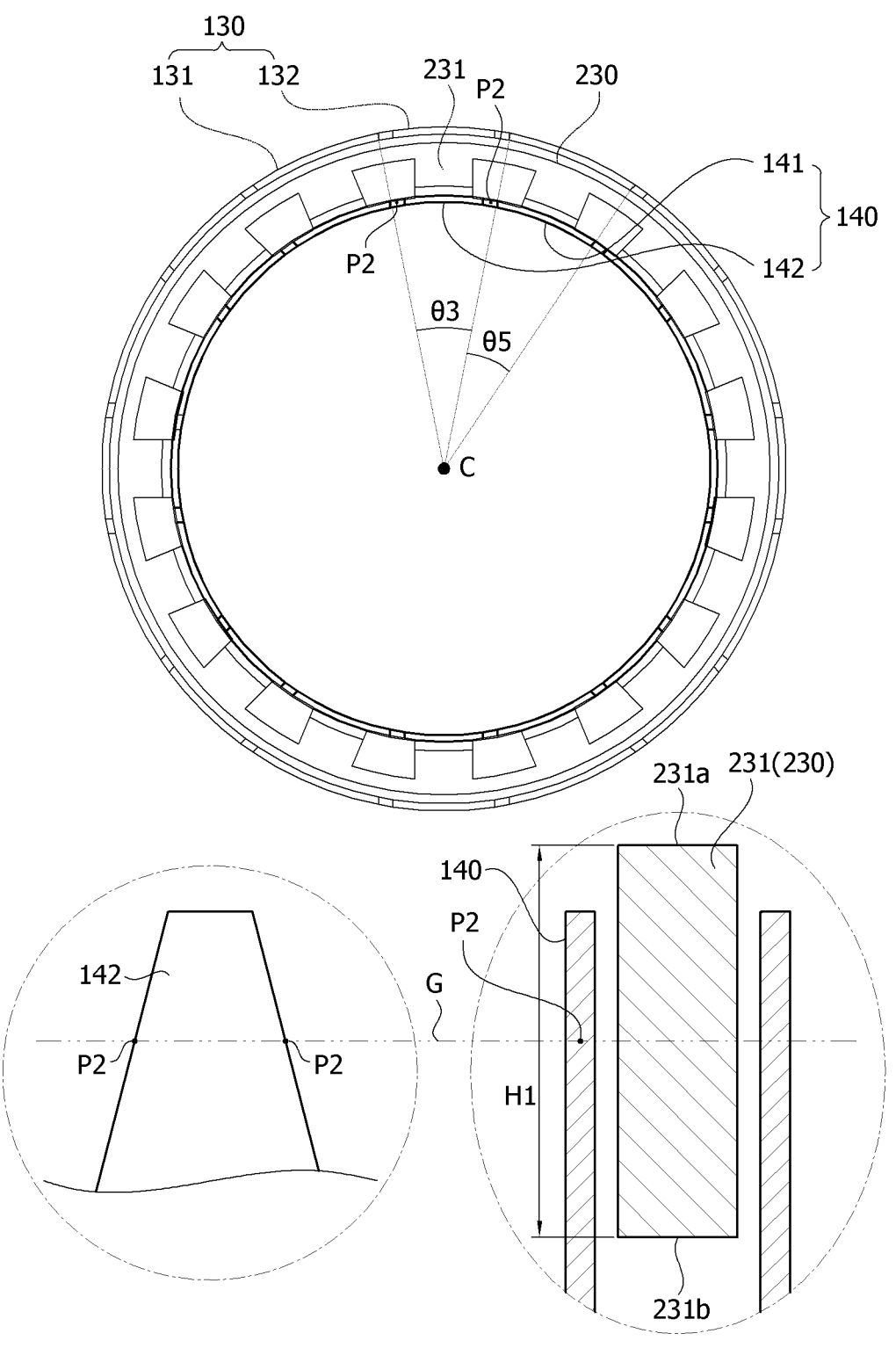

【FIG. 13】
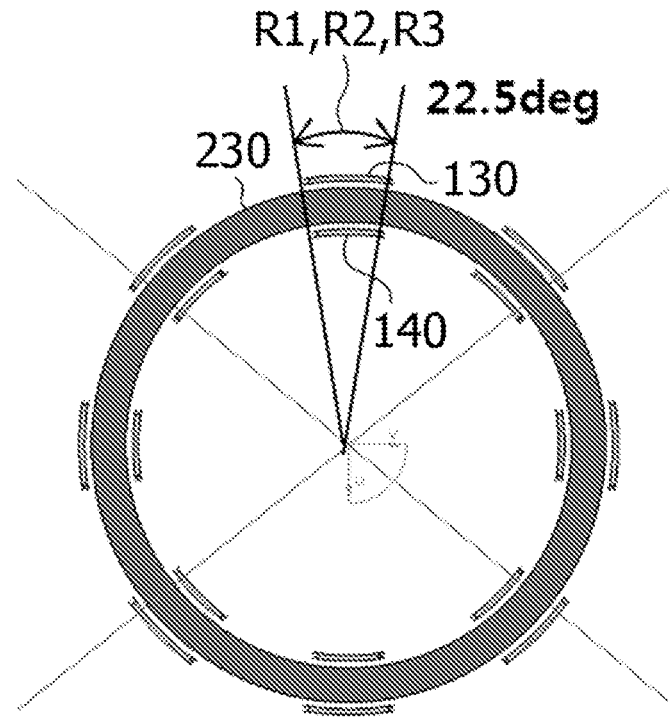
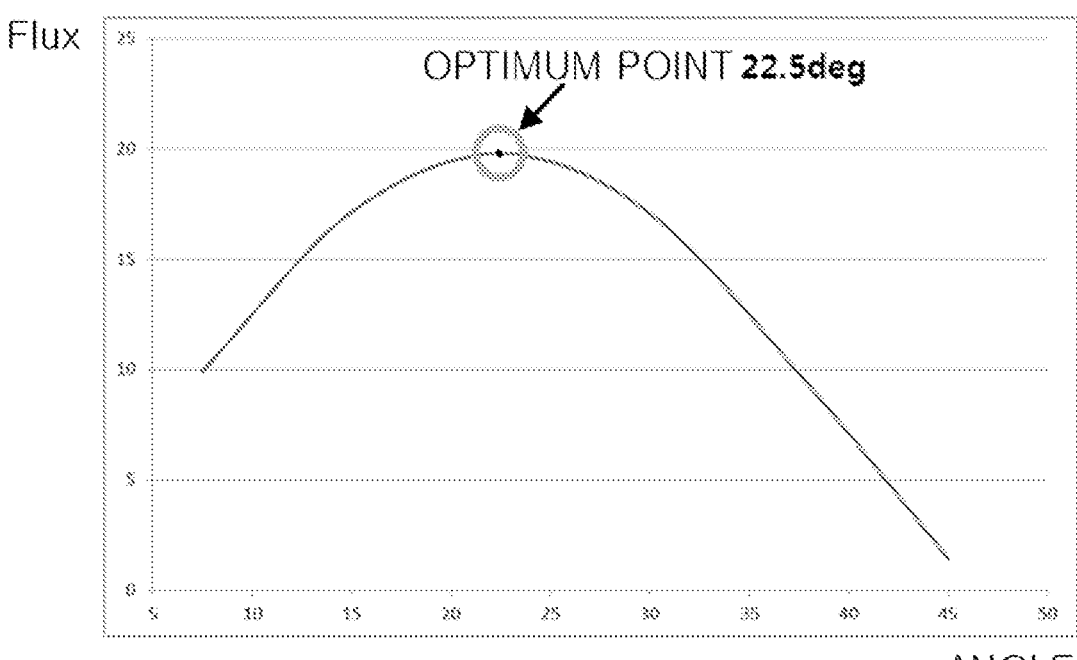

【FIG. 14】
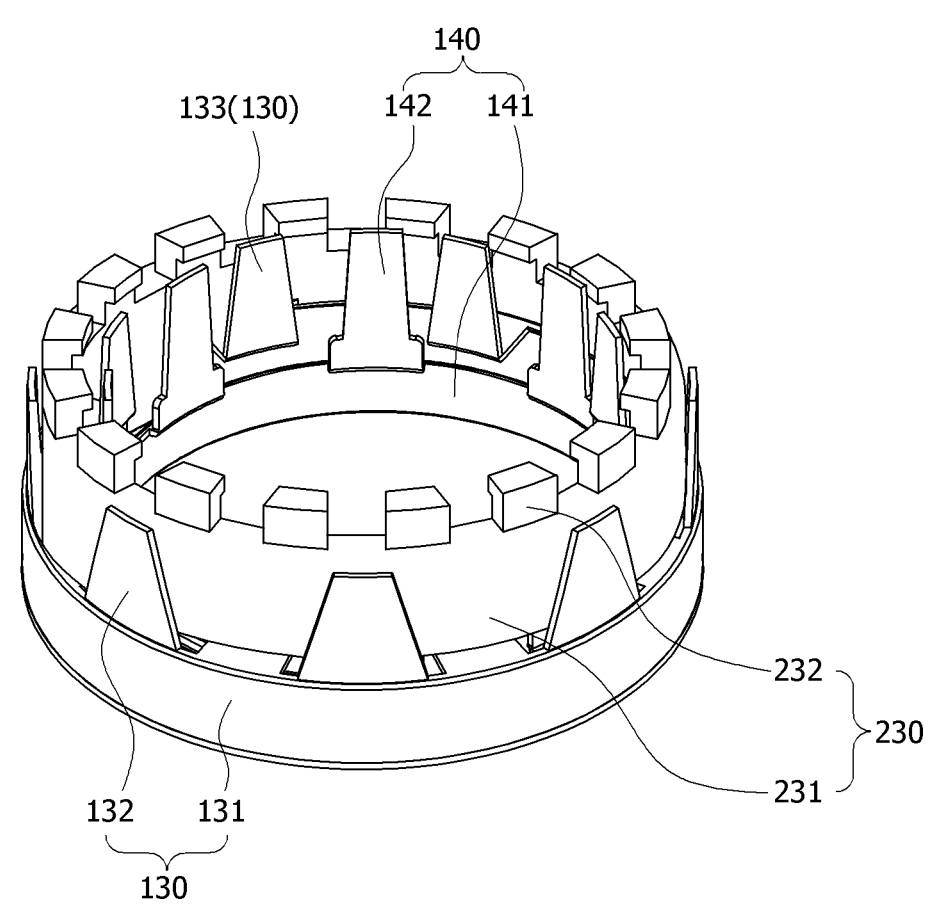

【FIG. 15】
130
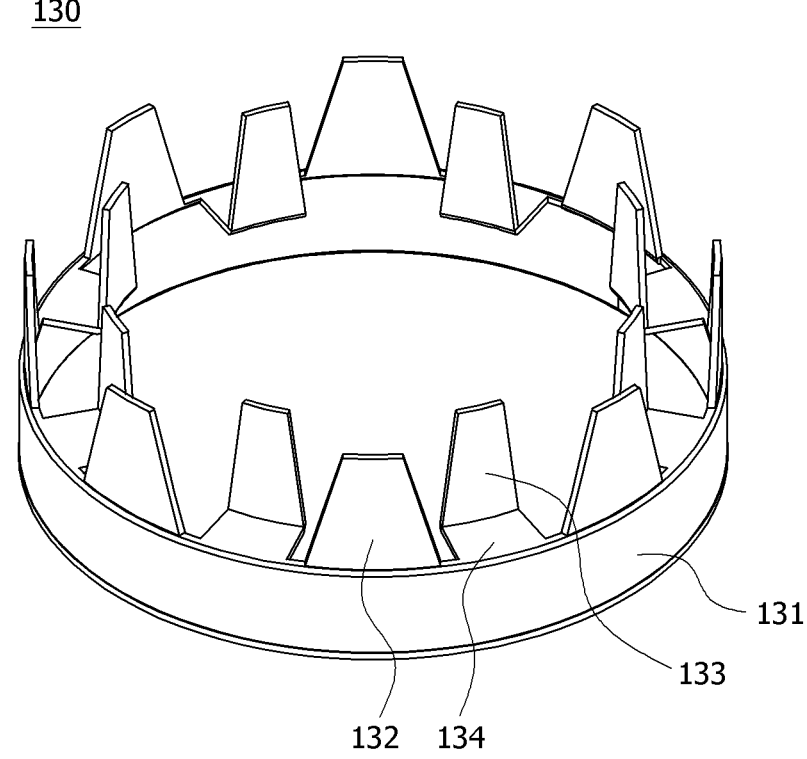

【FIG. 16】
140
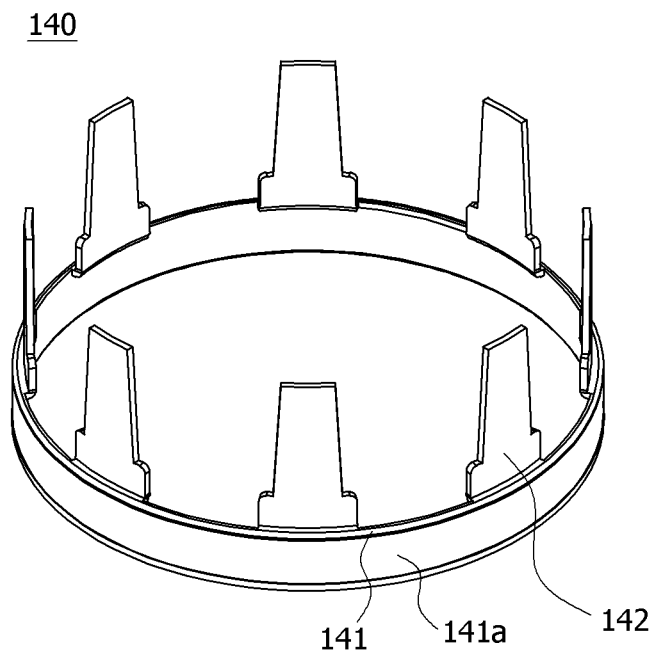
141     141a     142

【FIG. 17】
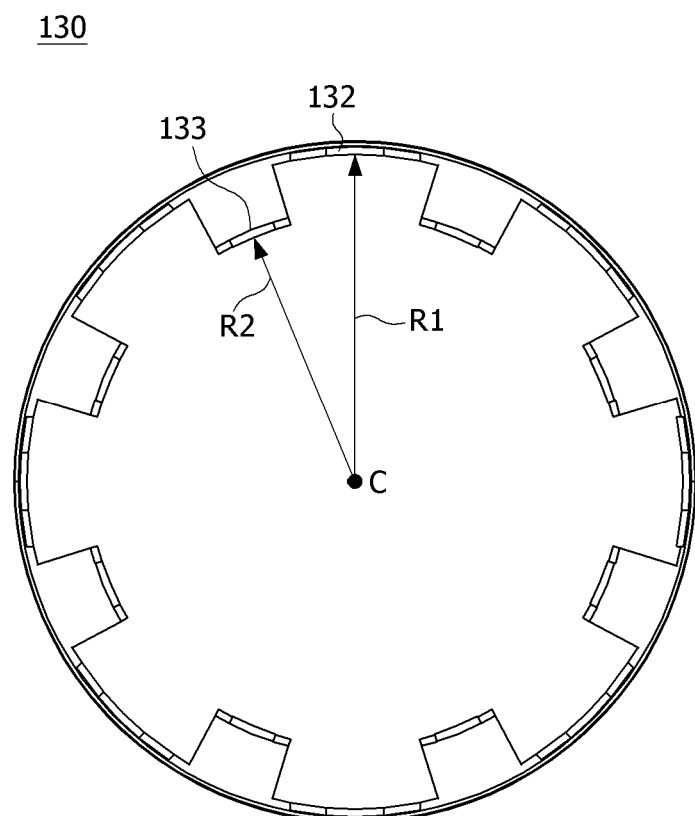

【FIG. 18】
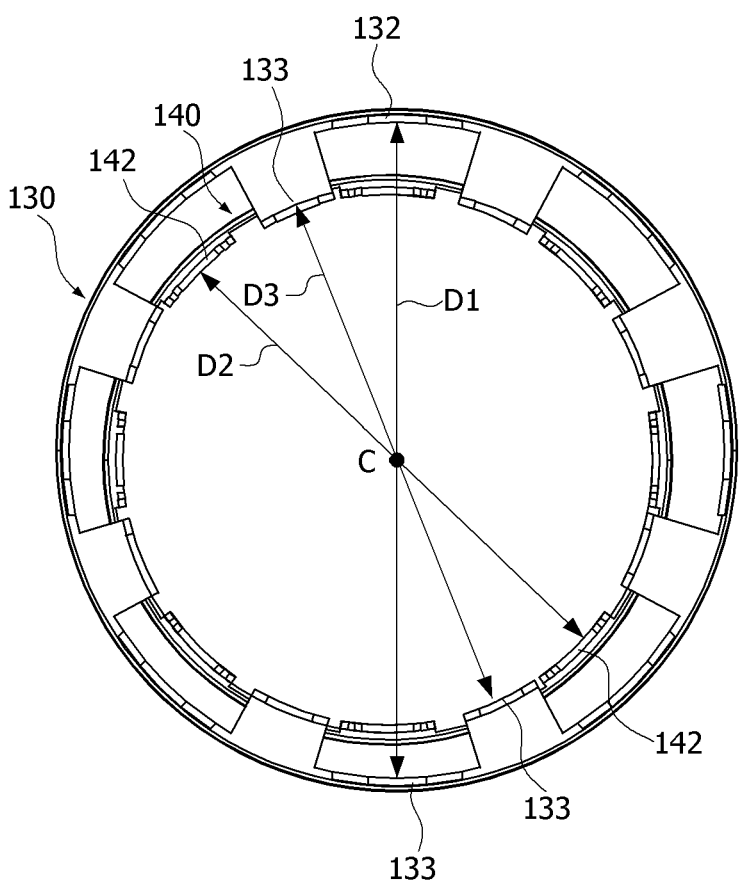

【FIG. 19】
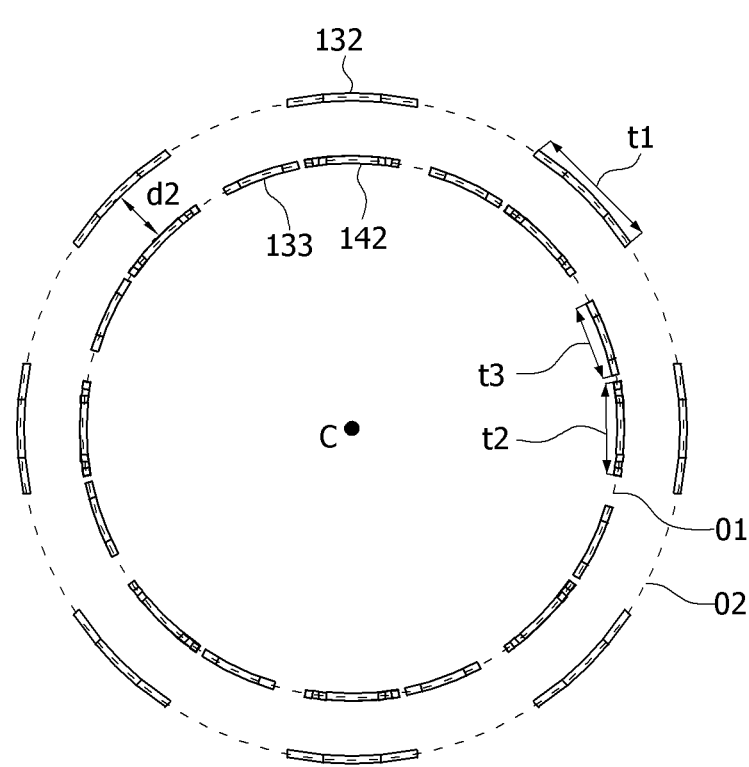

【FIG. 20】
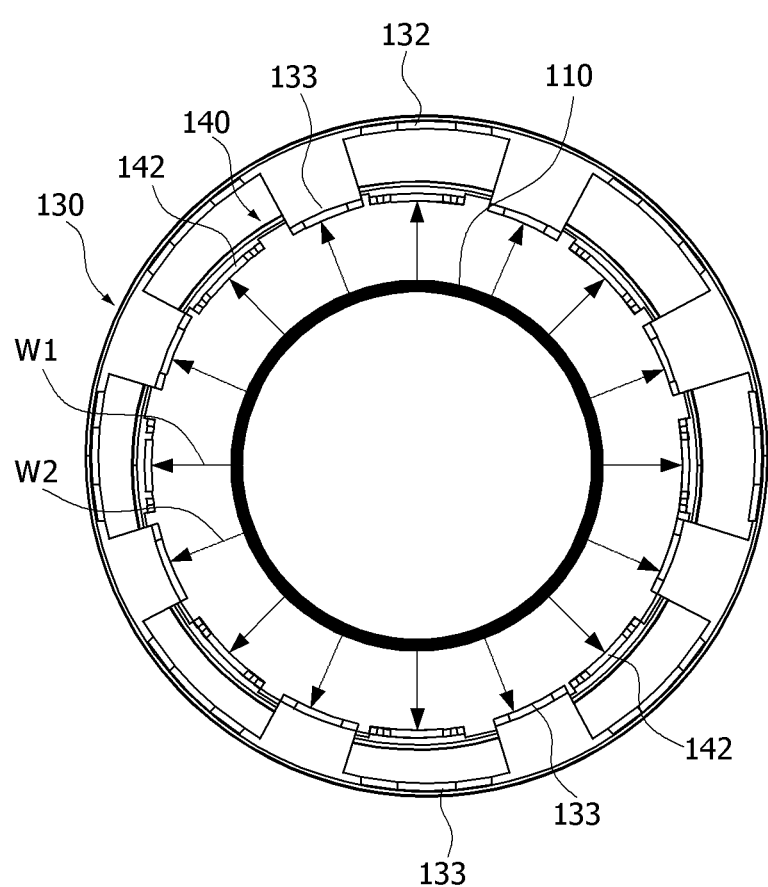

【FIG. 21】
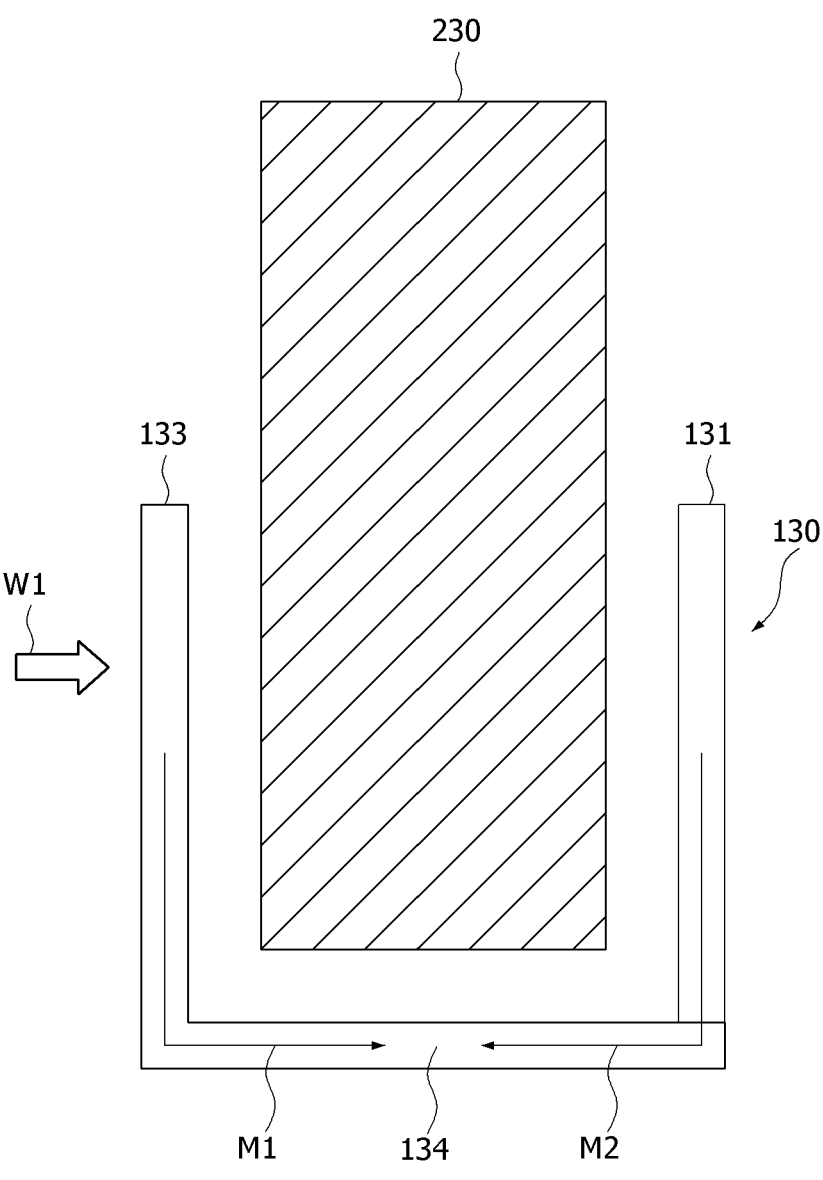

【FIG. 22】
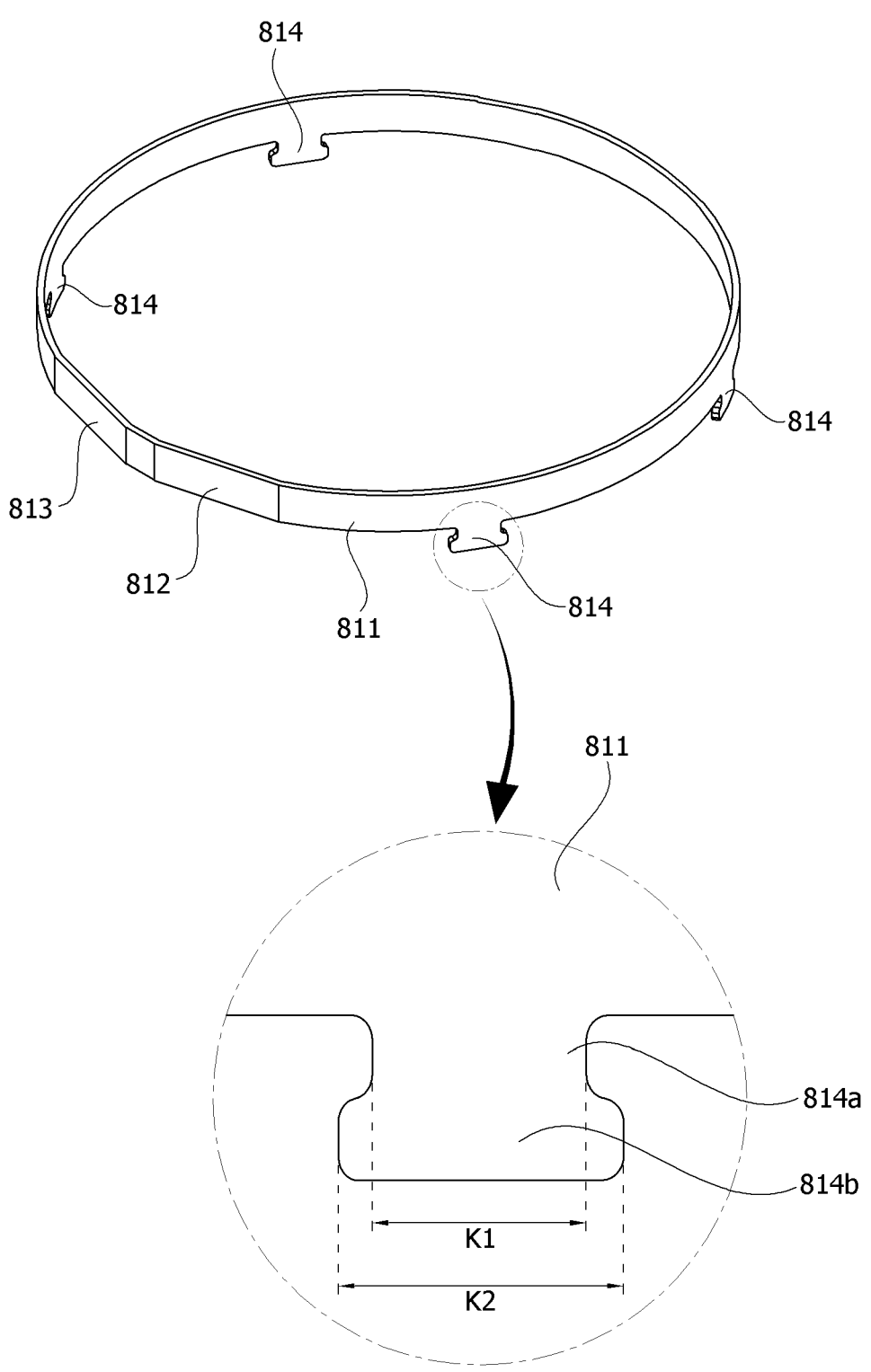

【FIG. 23】
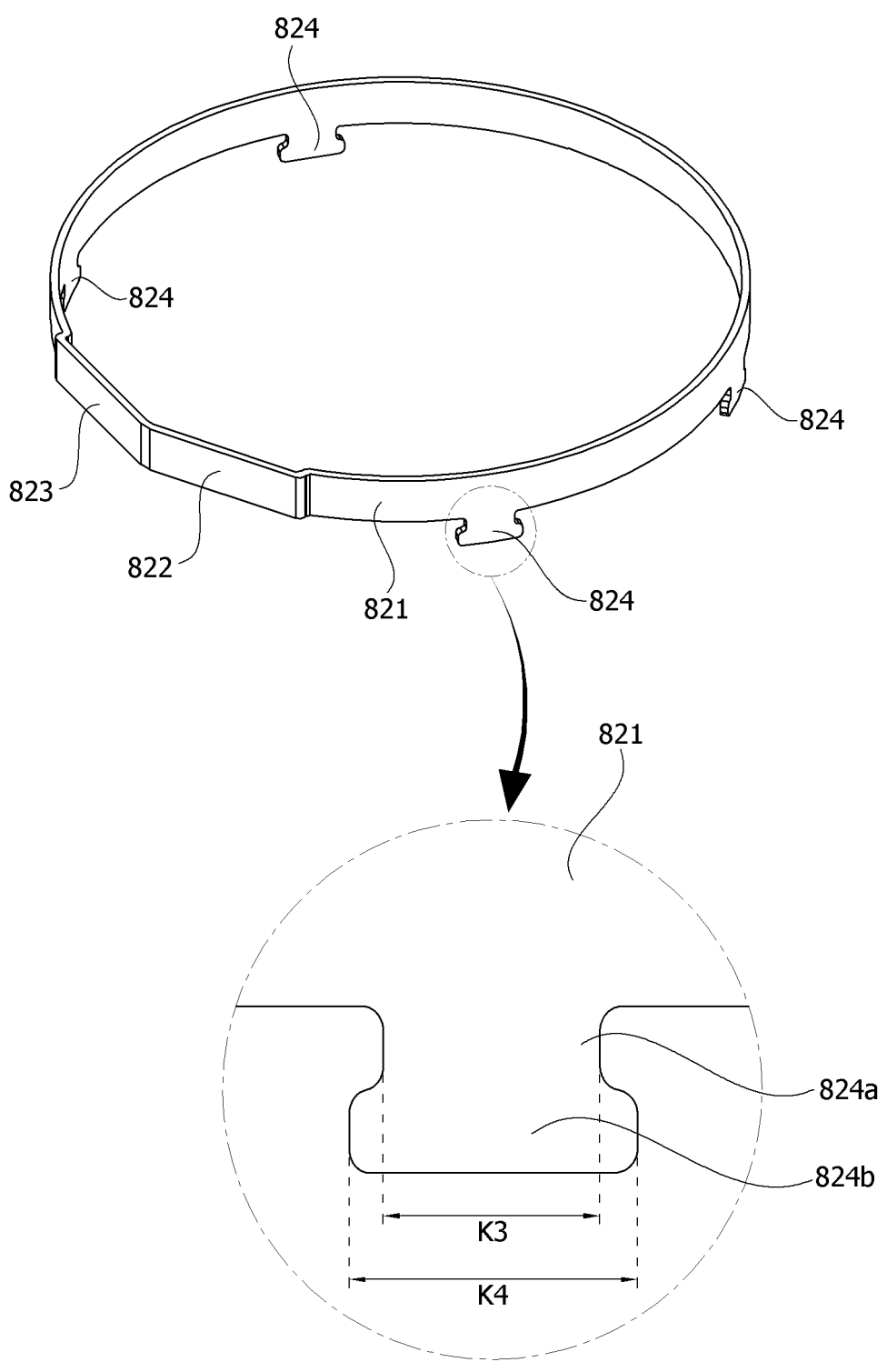

【FIG. 24】
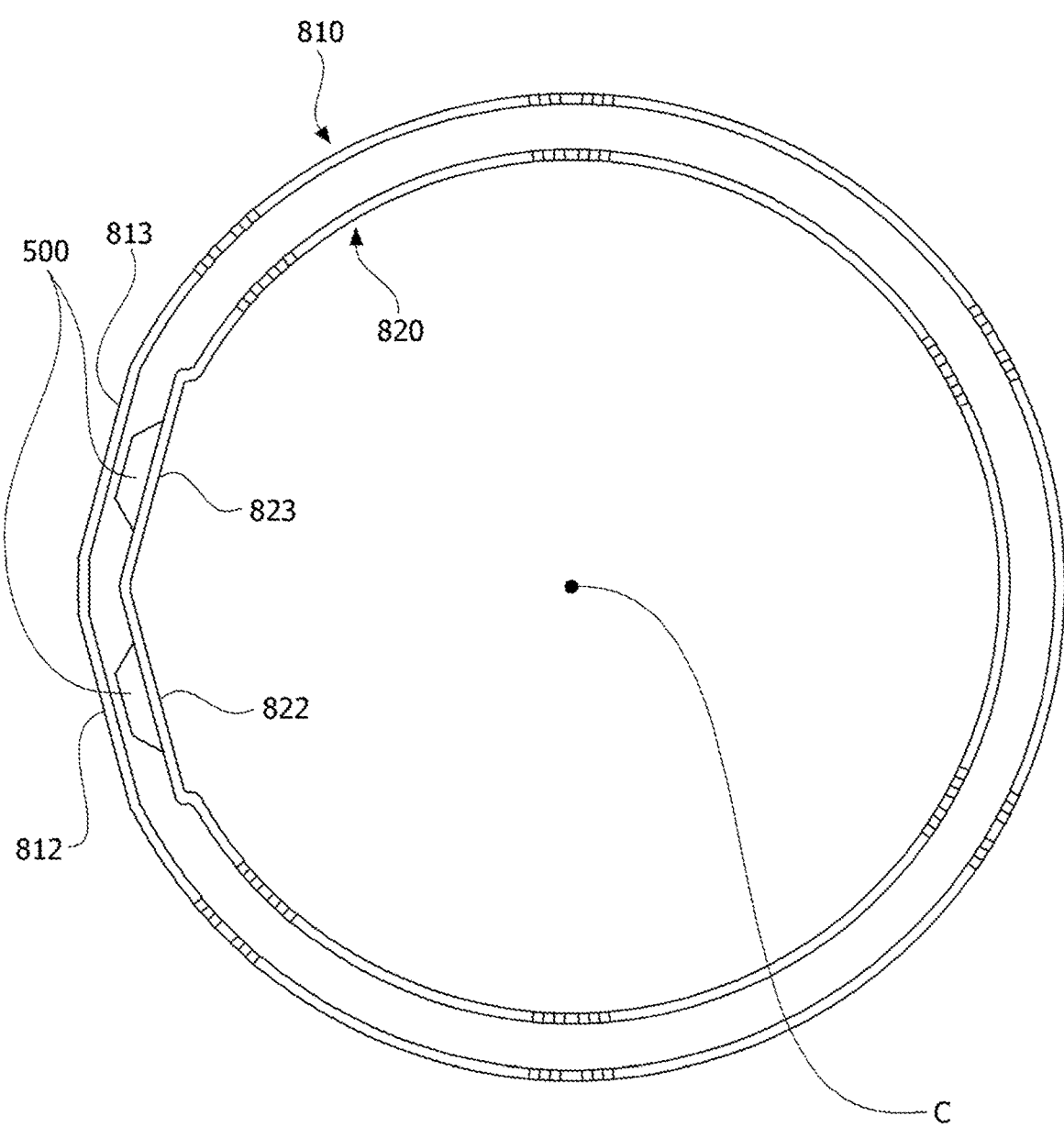

【FIG. 25】
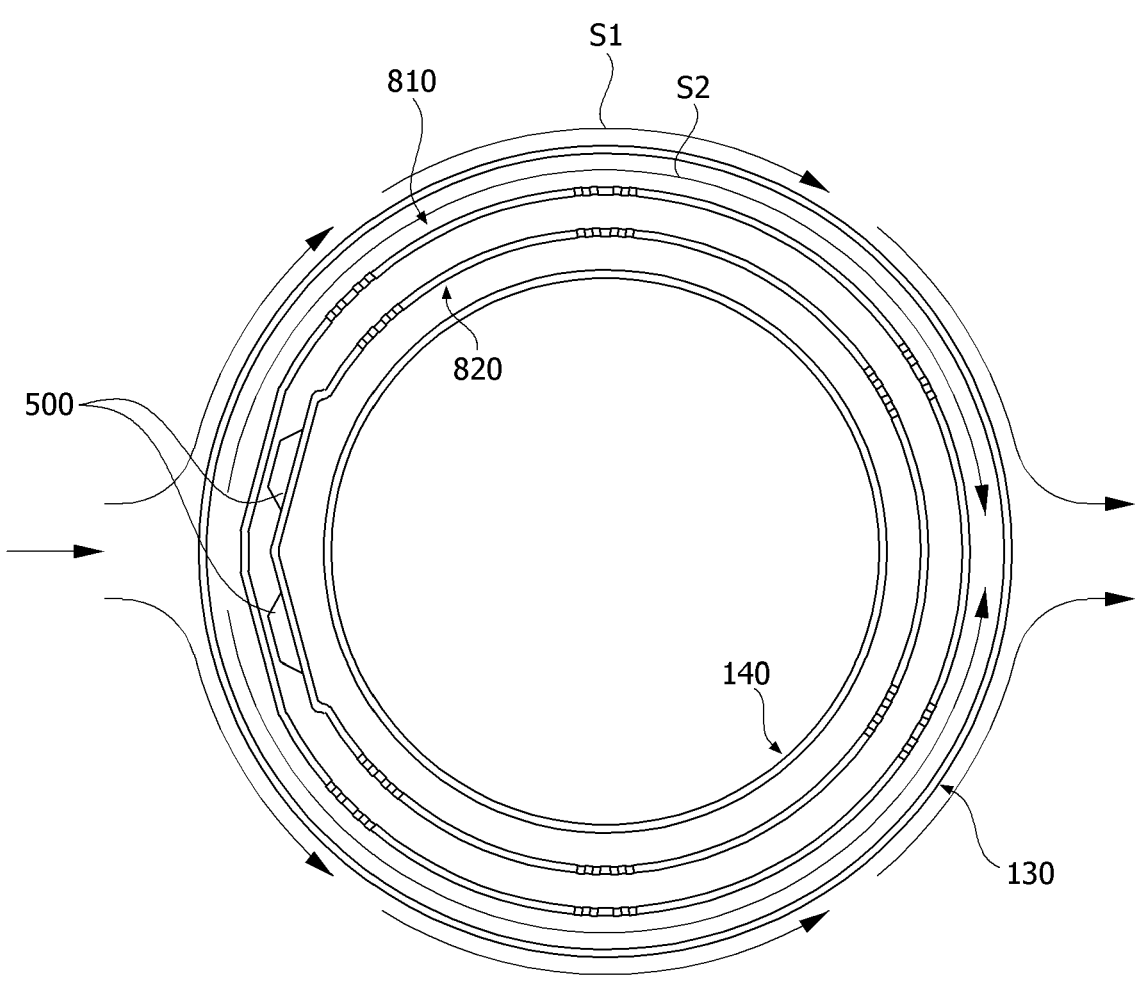

【FIG. 26】
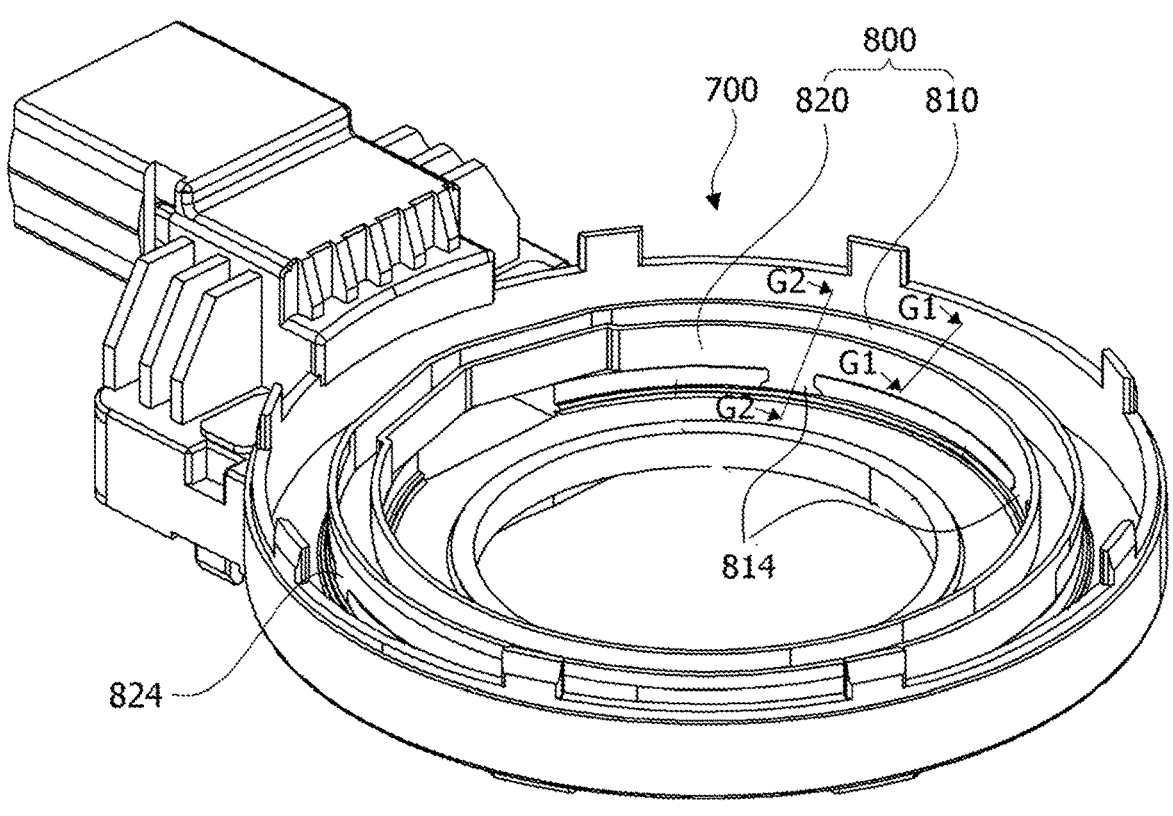

【FIG. 27】
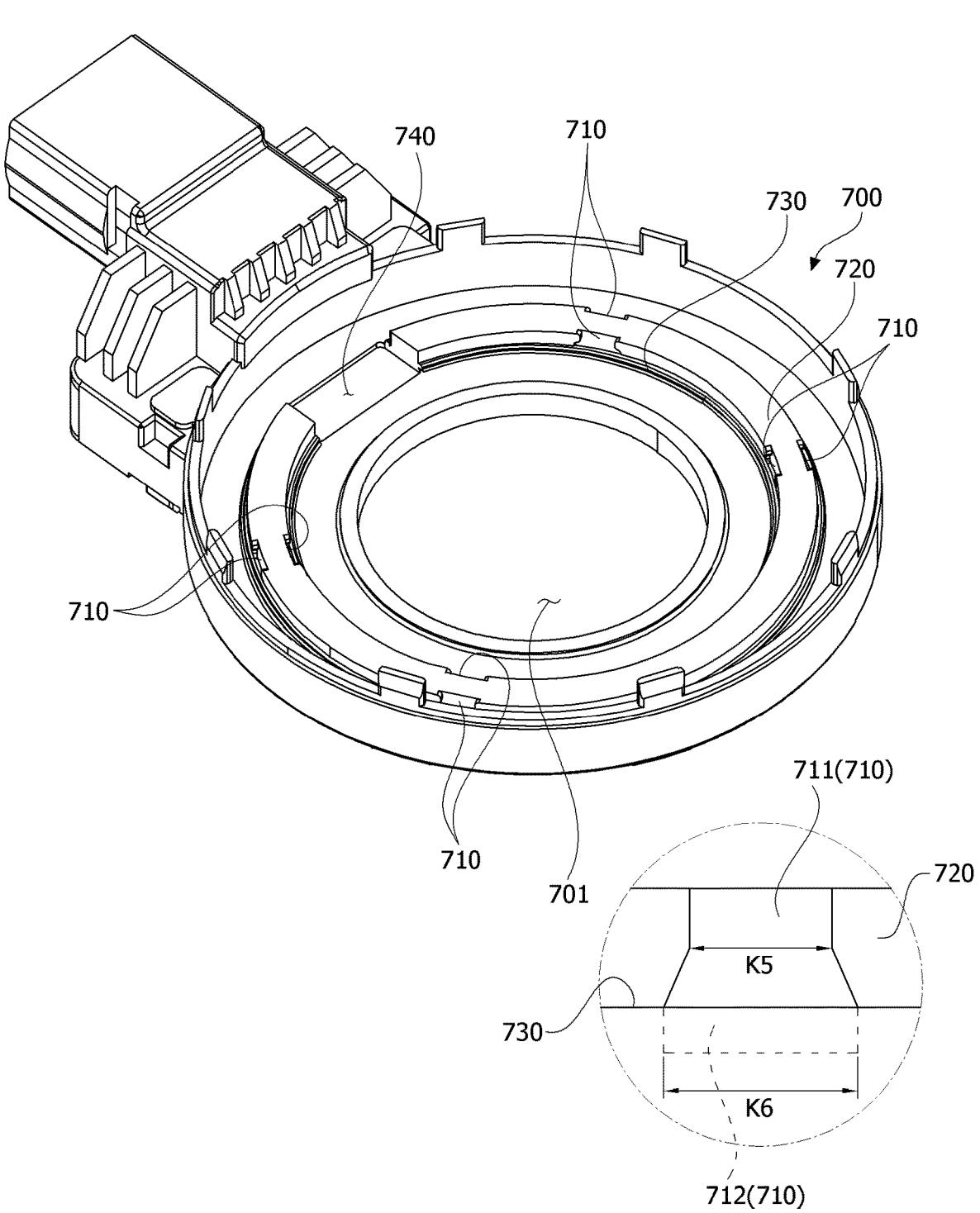

【FIG. 28】
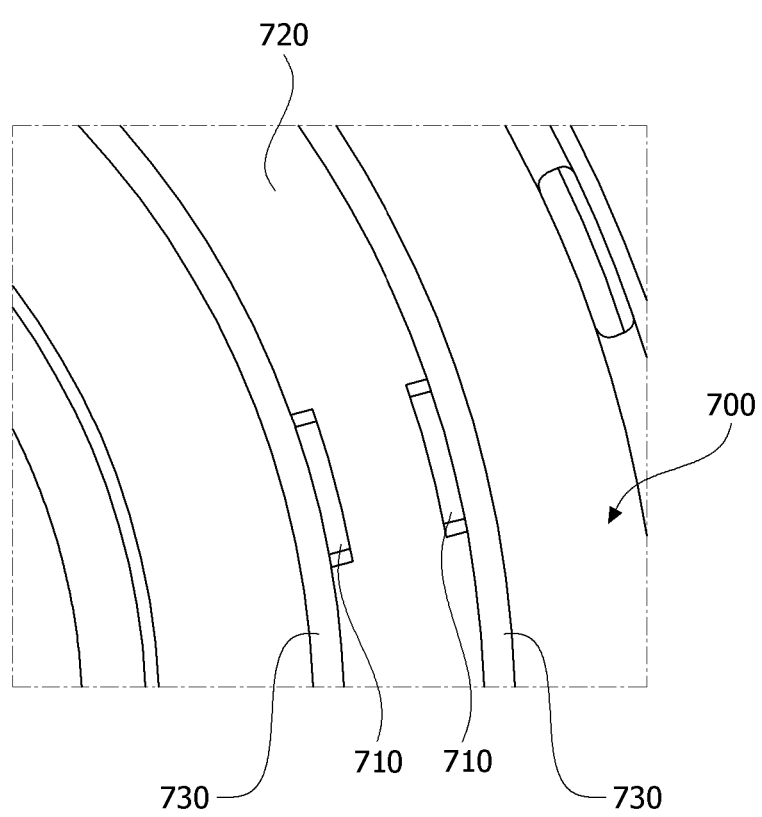

【FIG. 29】
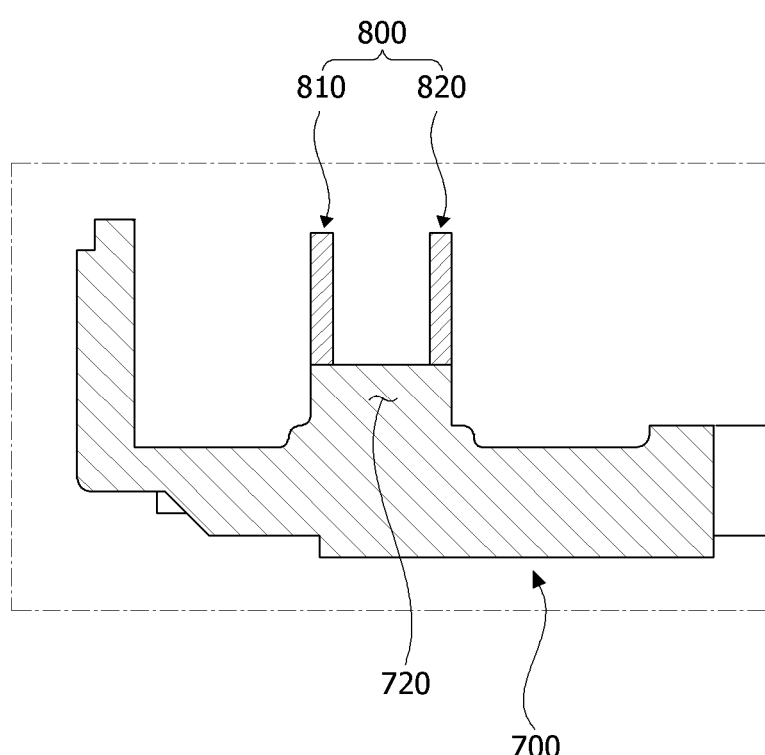

【FIG. 30】
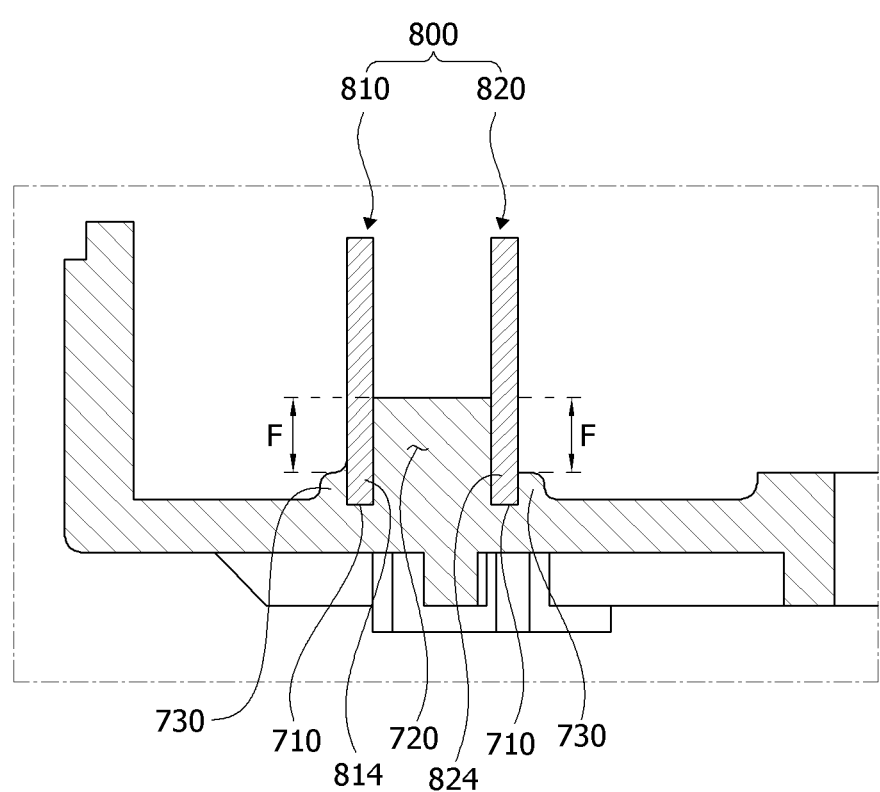

【FIG. 31】
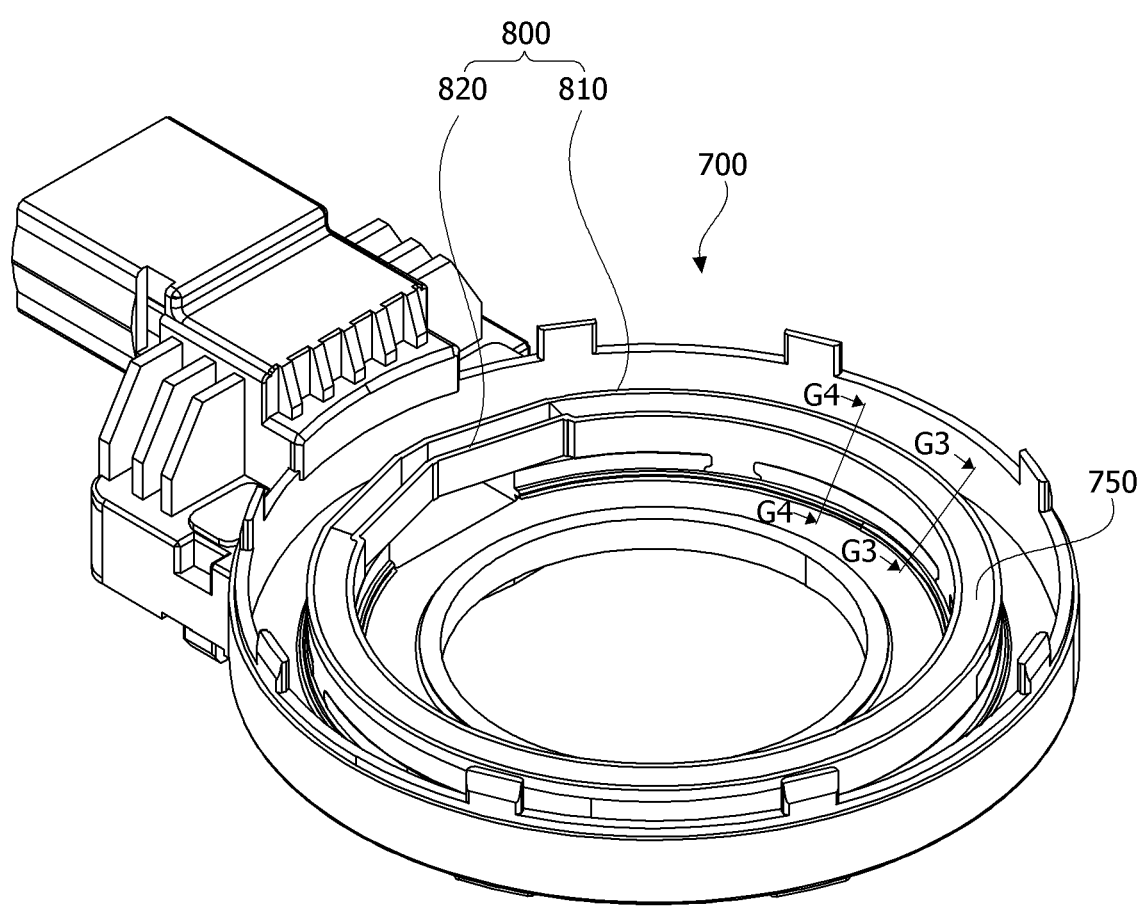

【FIG. 32】
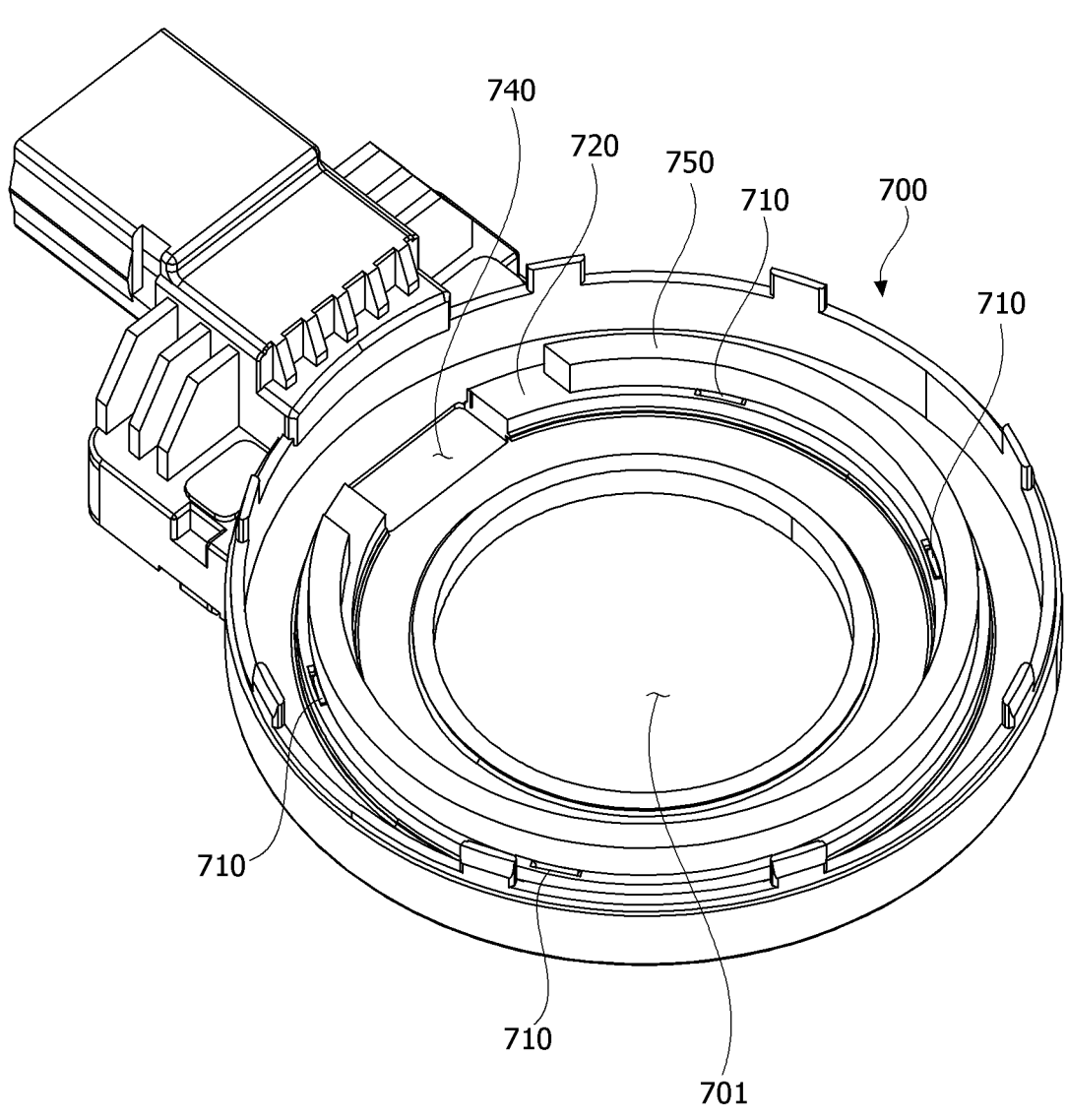

【FIG. 33】
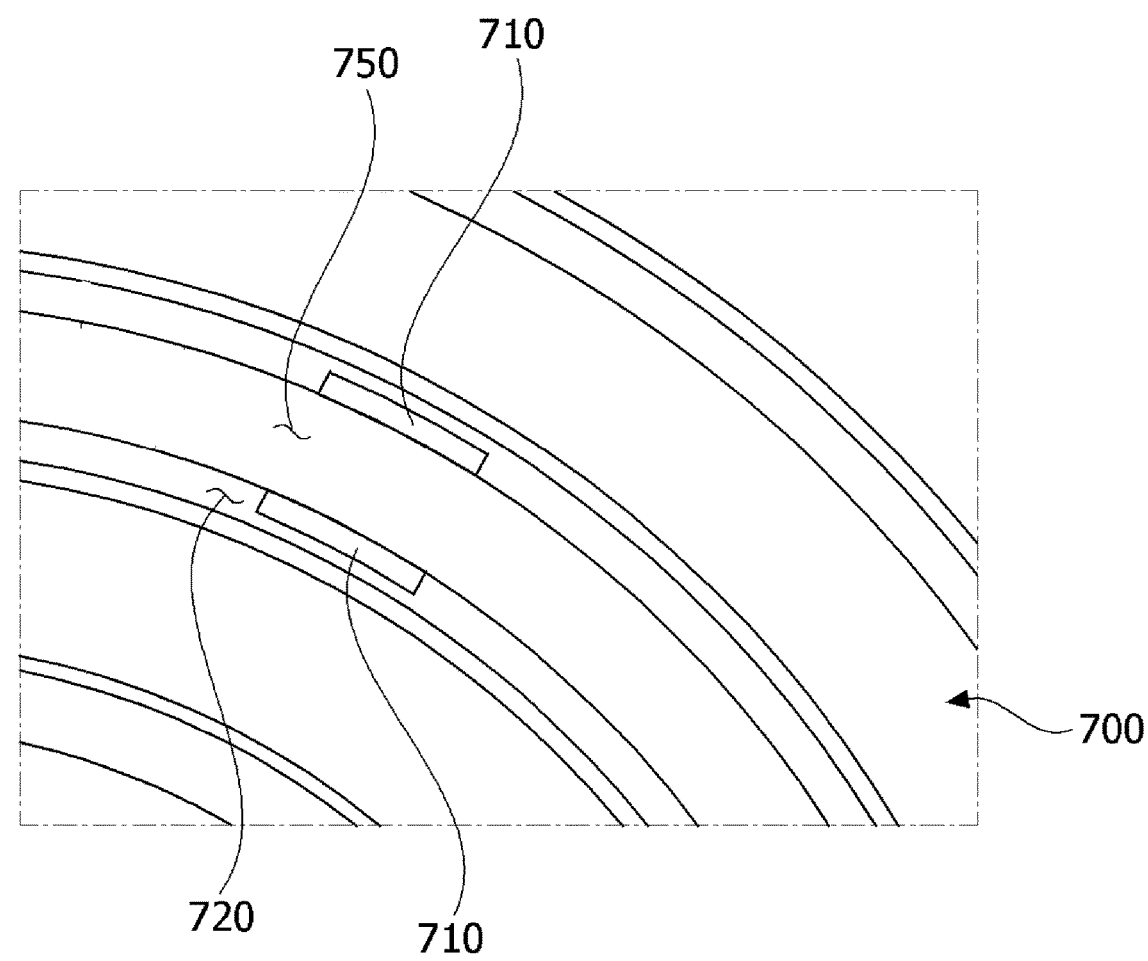

【FIG. 34】
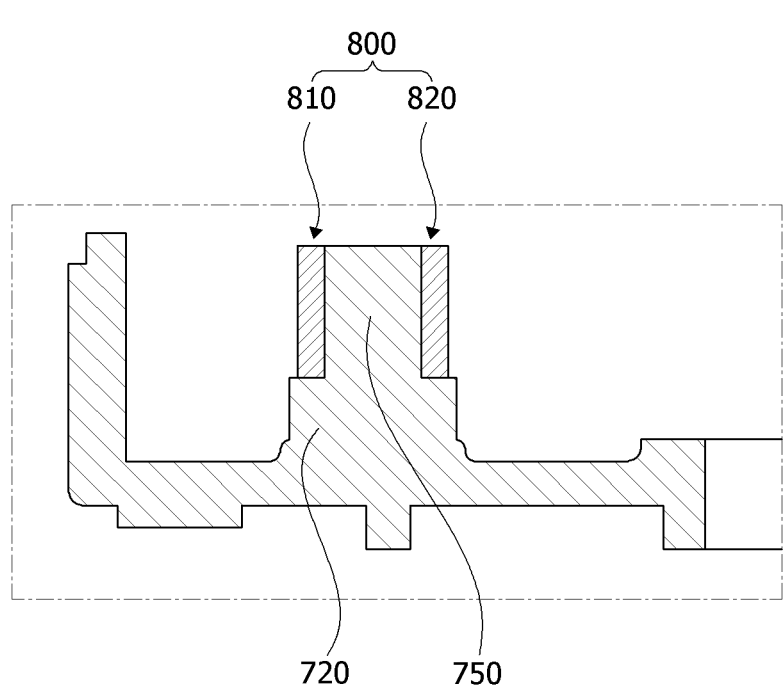

【FIG. 35】
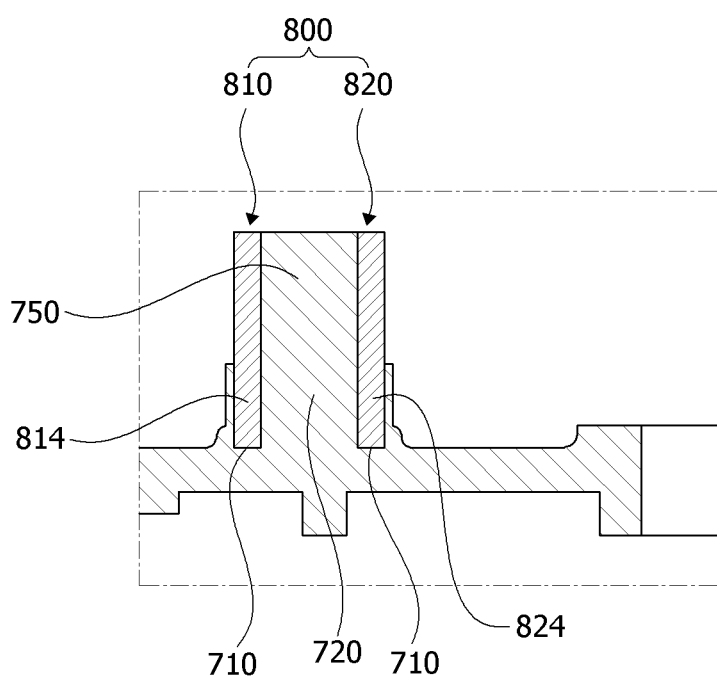

【FIG. 36】
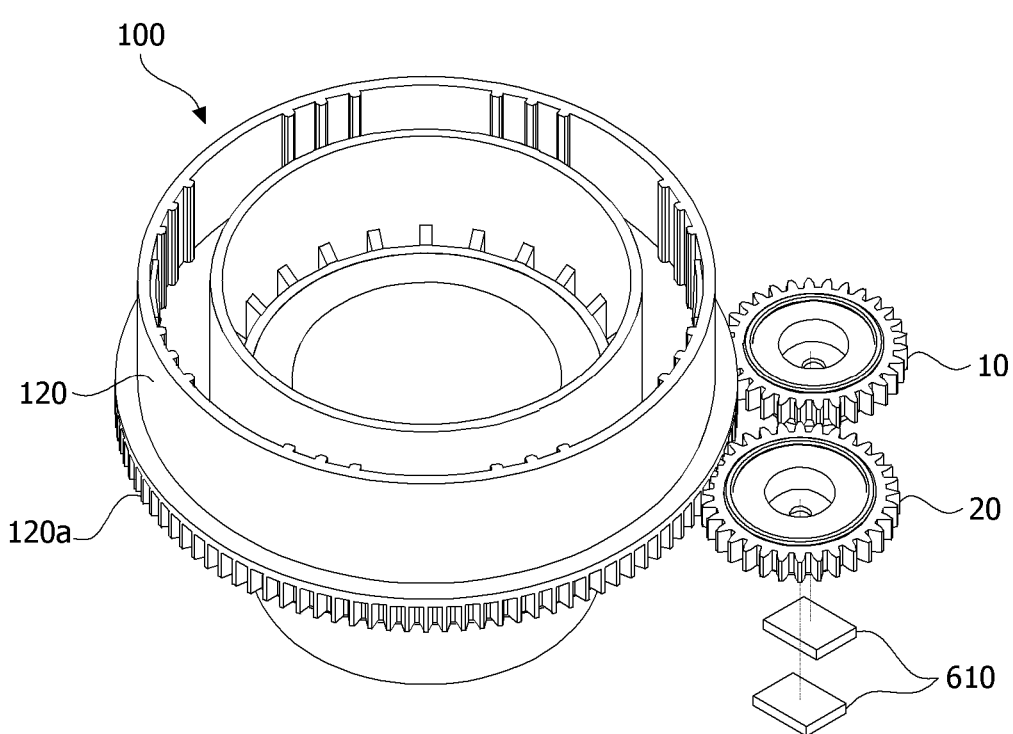

【FIG. 37】
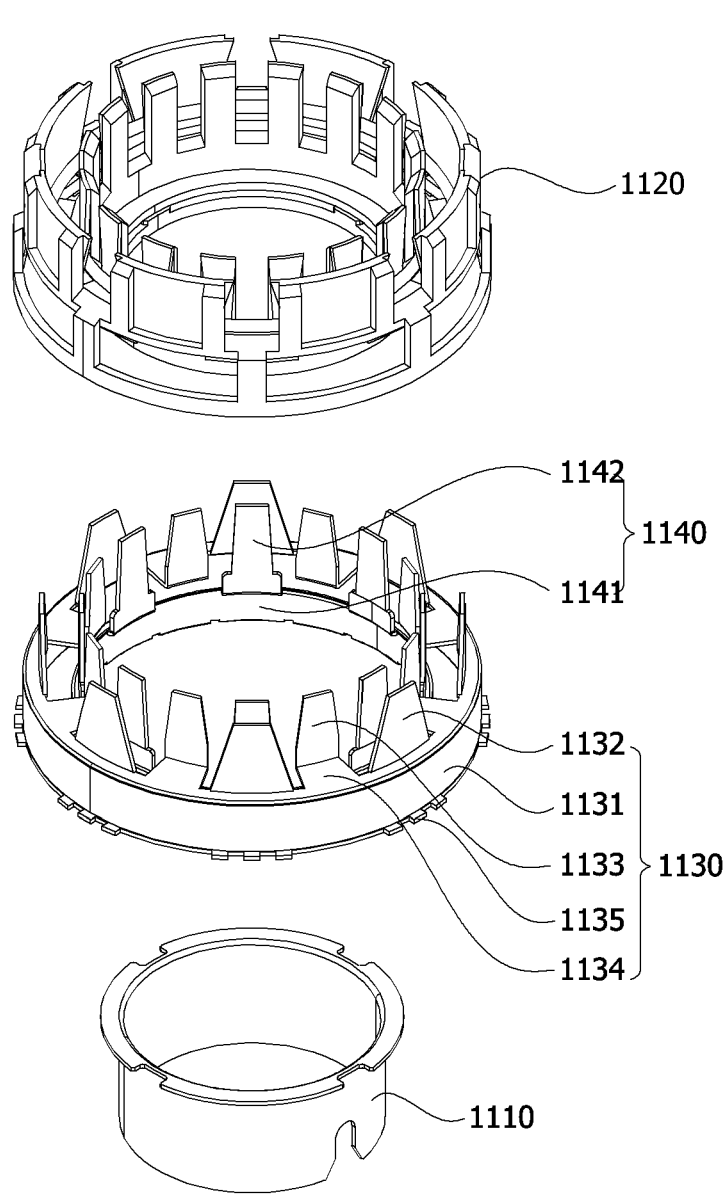

【FIG. 38】
1810(1800)
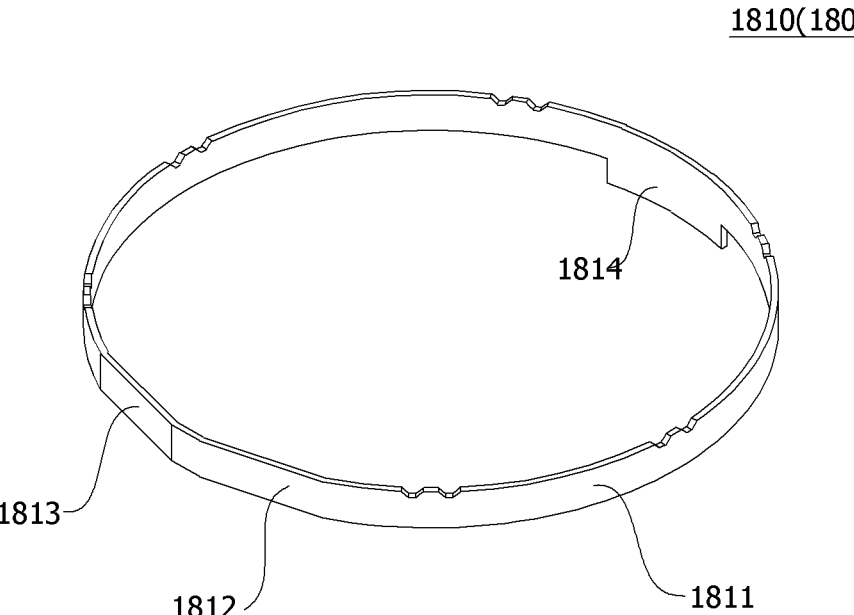

【FIG. 39】
1820(1800)
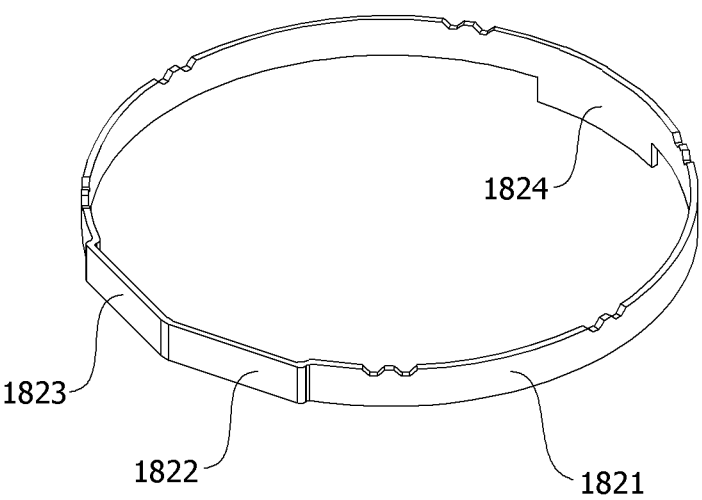
1824
1823
1822
1821

【FIG. 40】
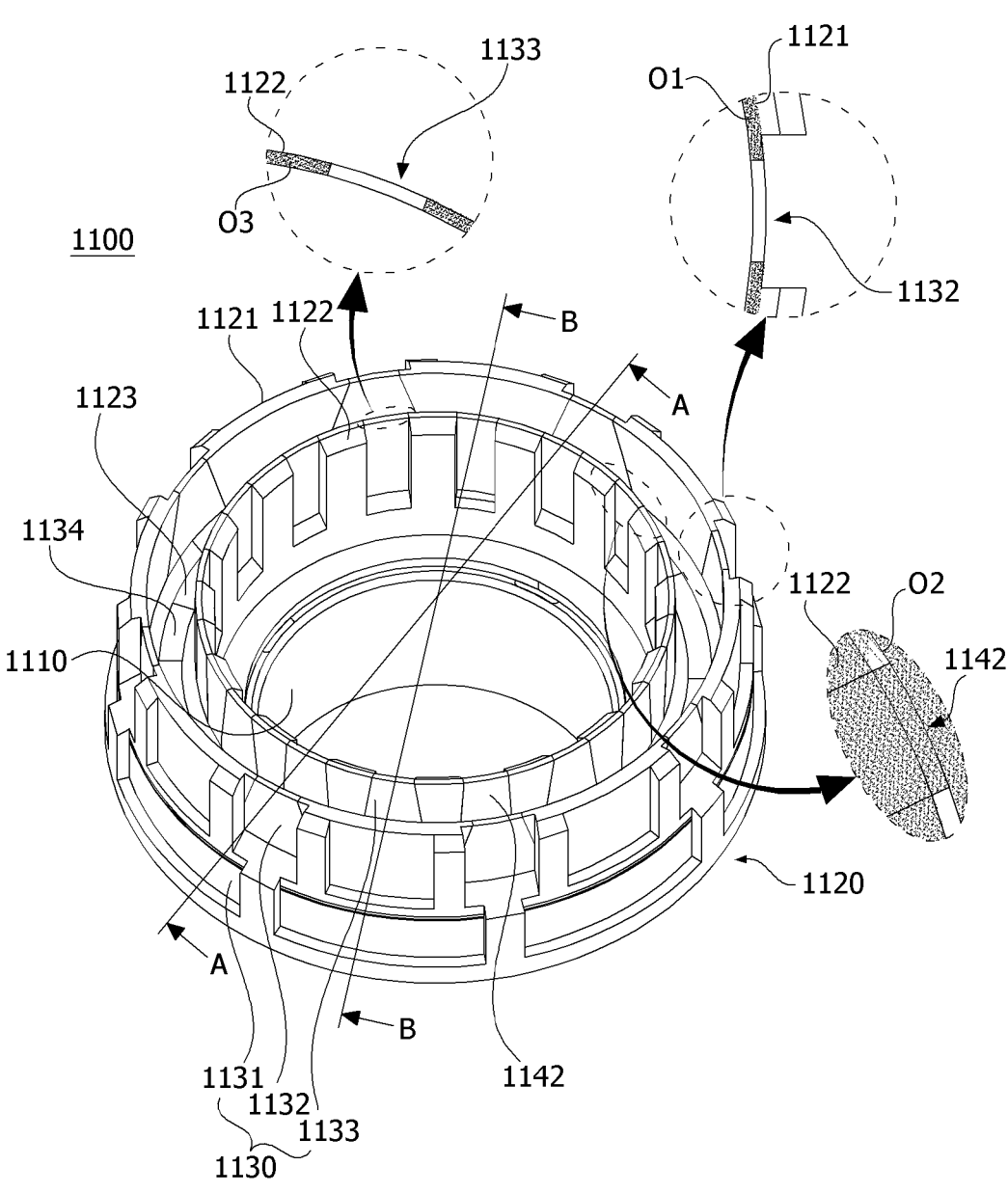

[FIG. 41]
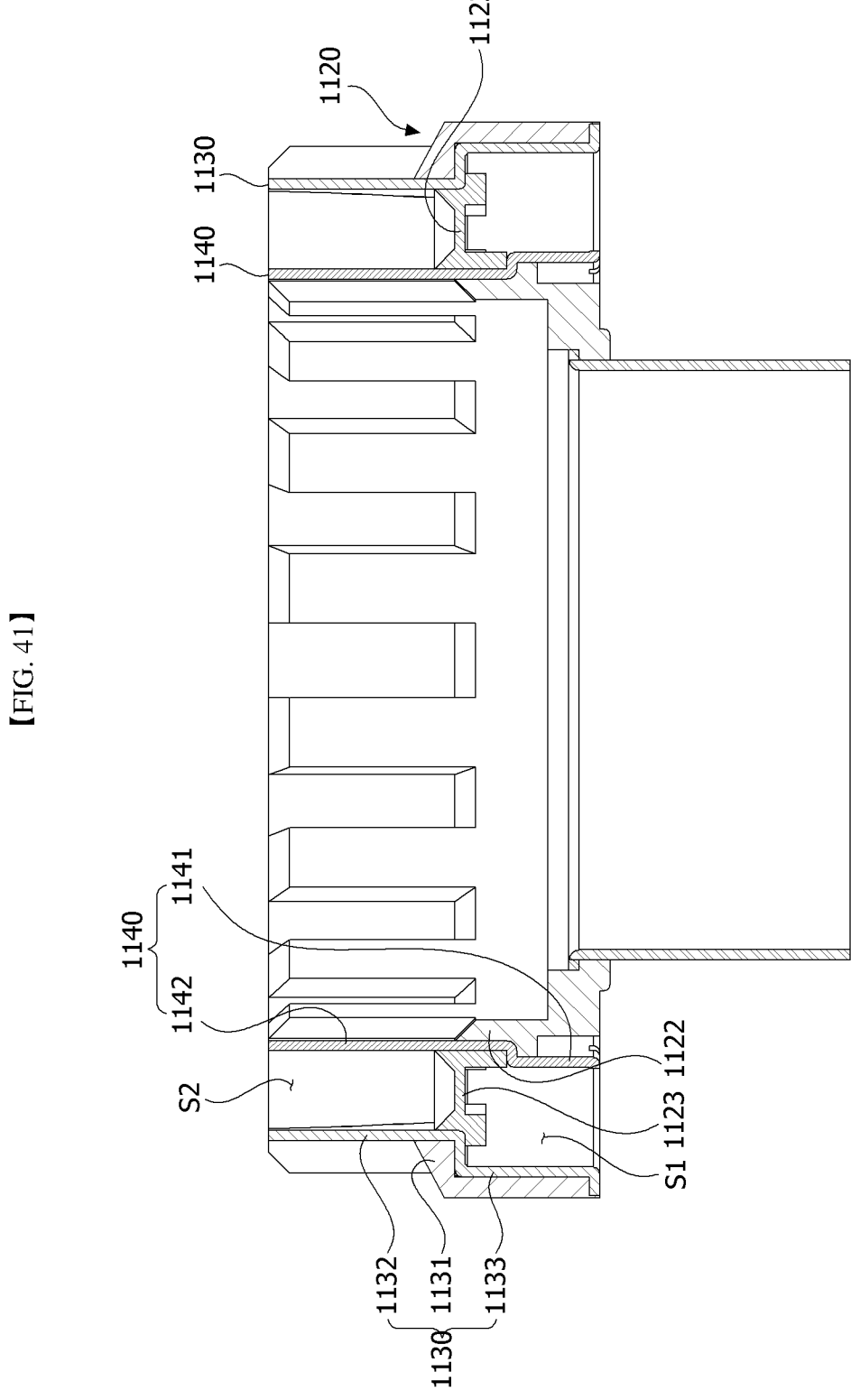

[FIG. 42]
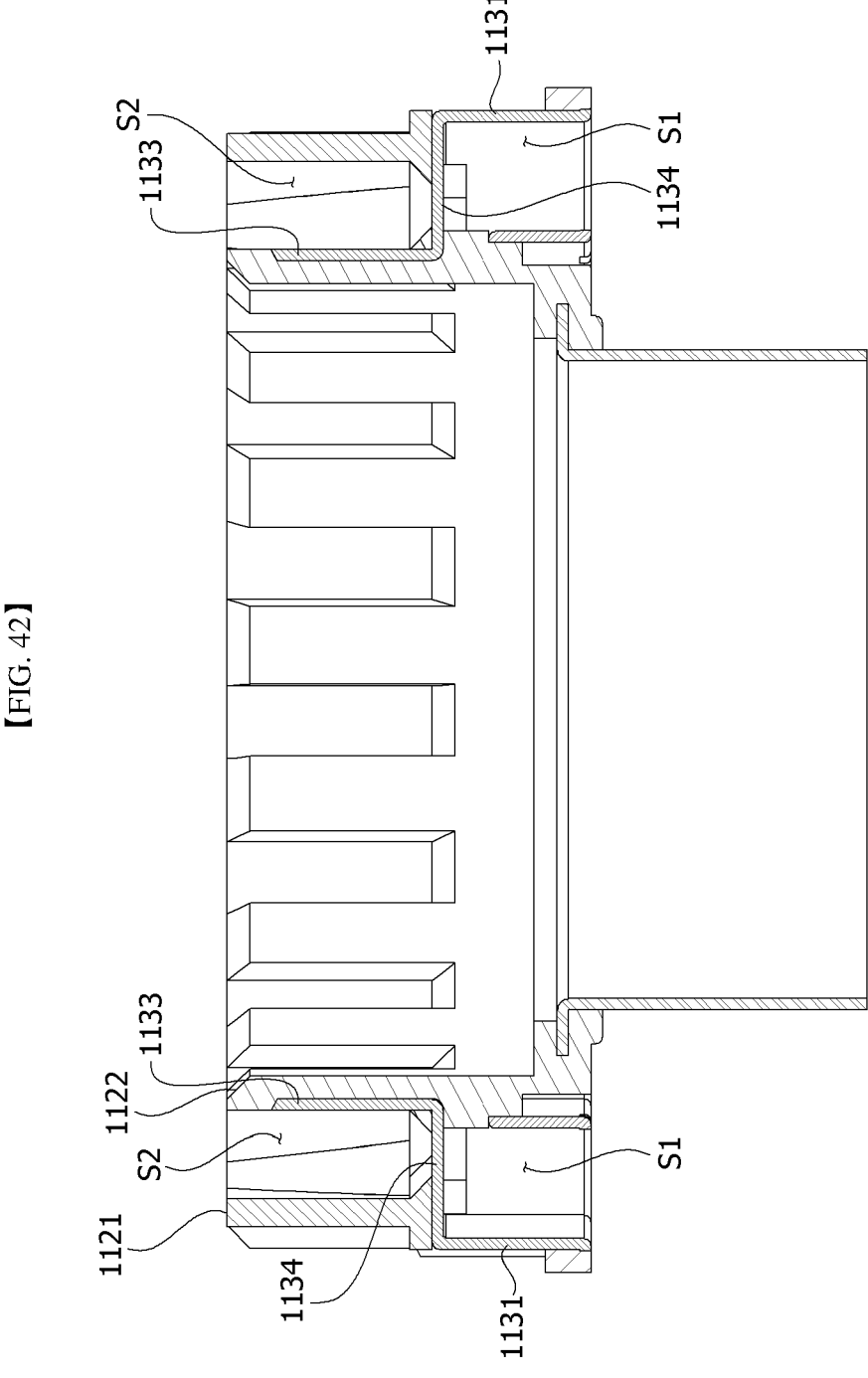

【FIG. 43】
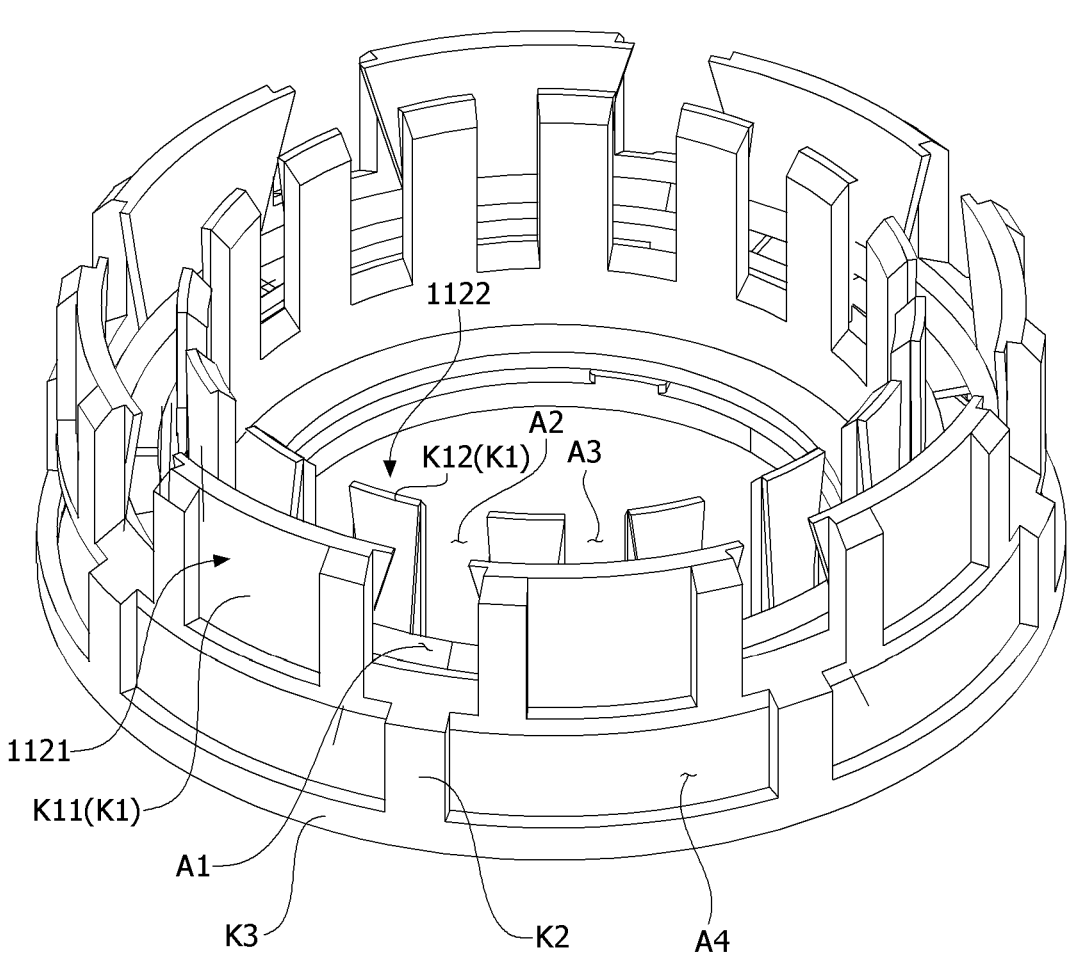

【FIG. 44】
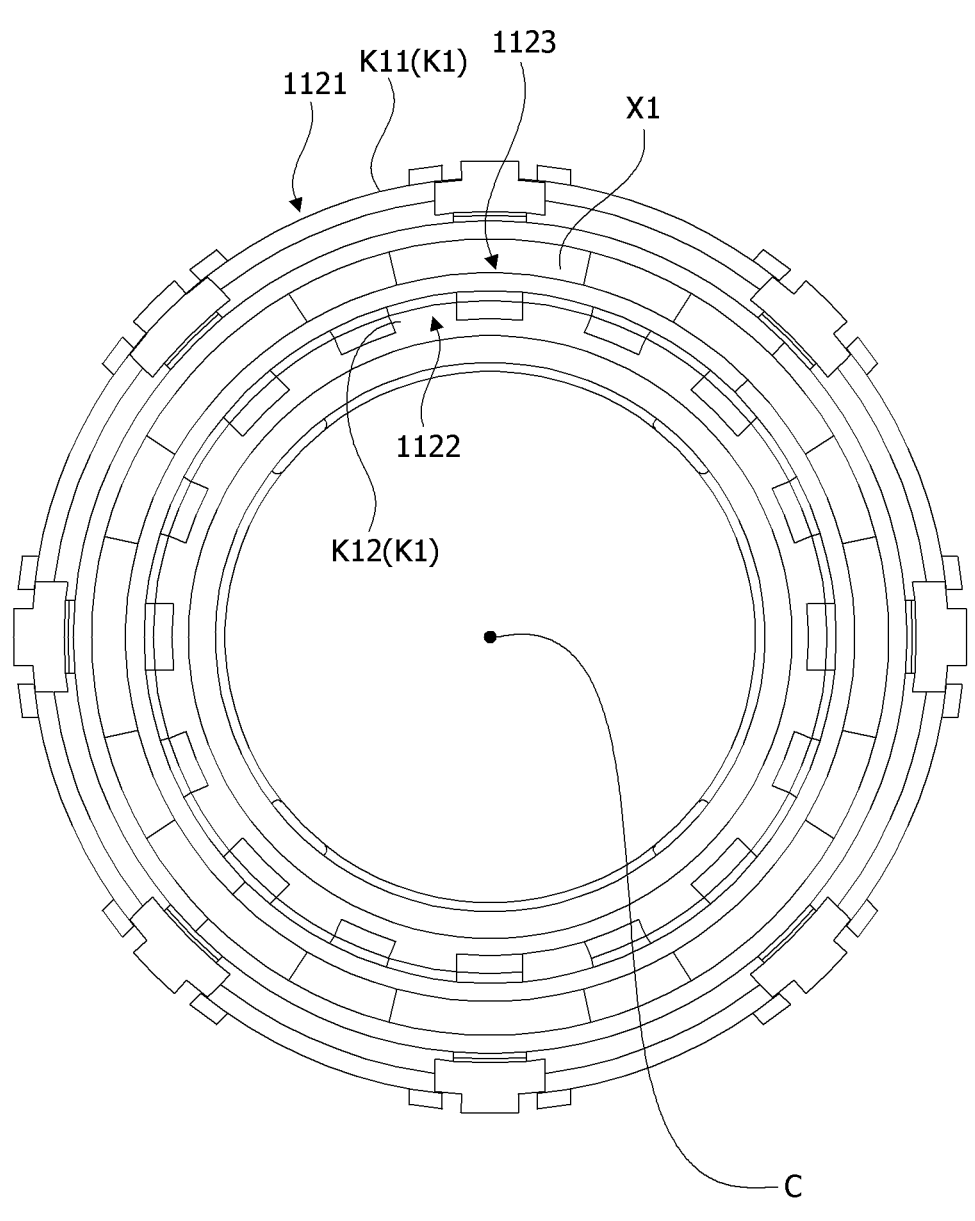

【FIG. 45】
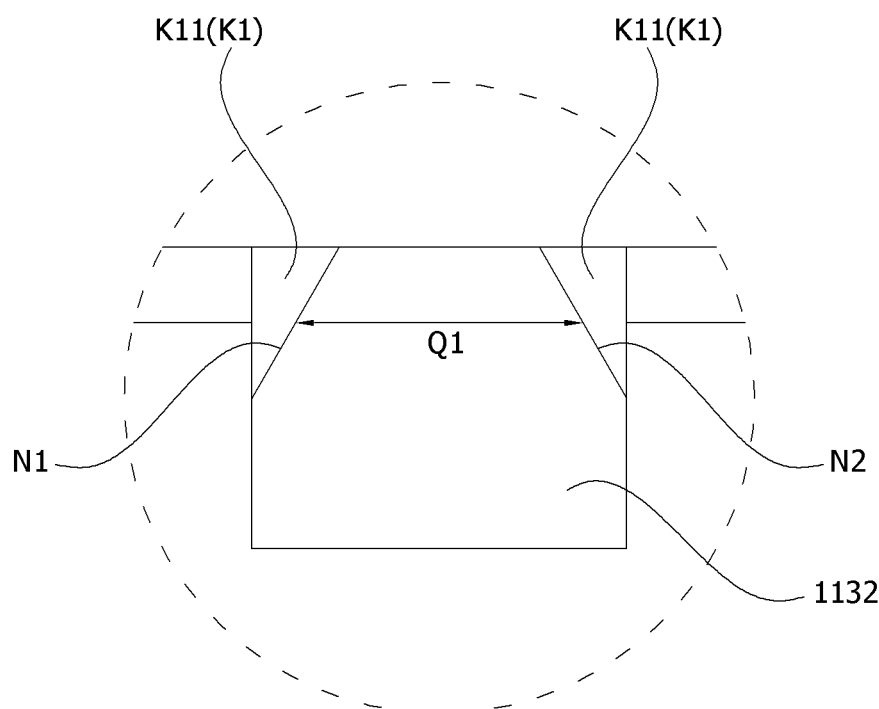

【FIG. 46】
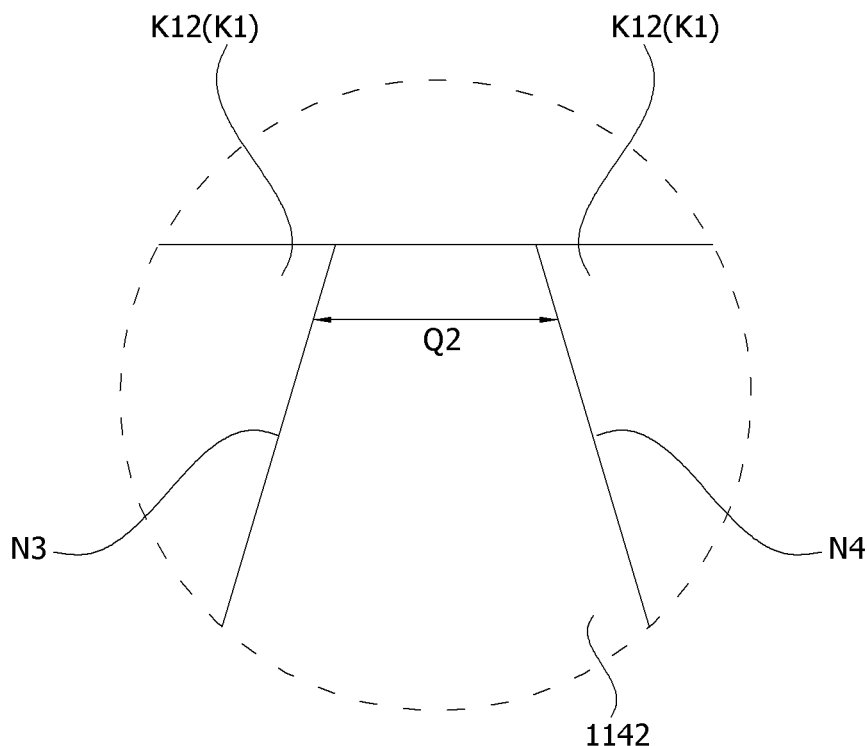

【FIG. 47】
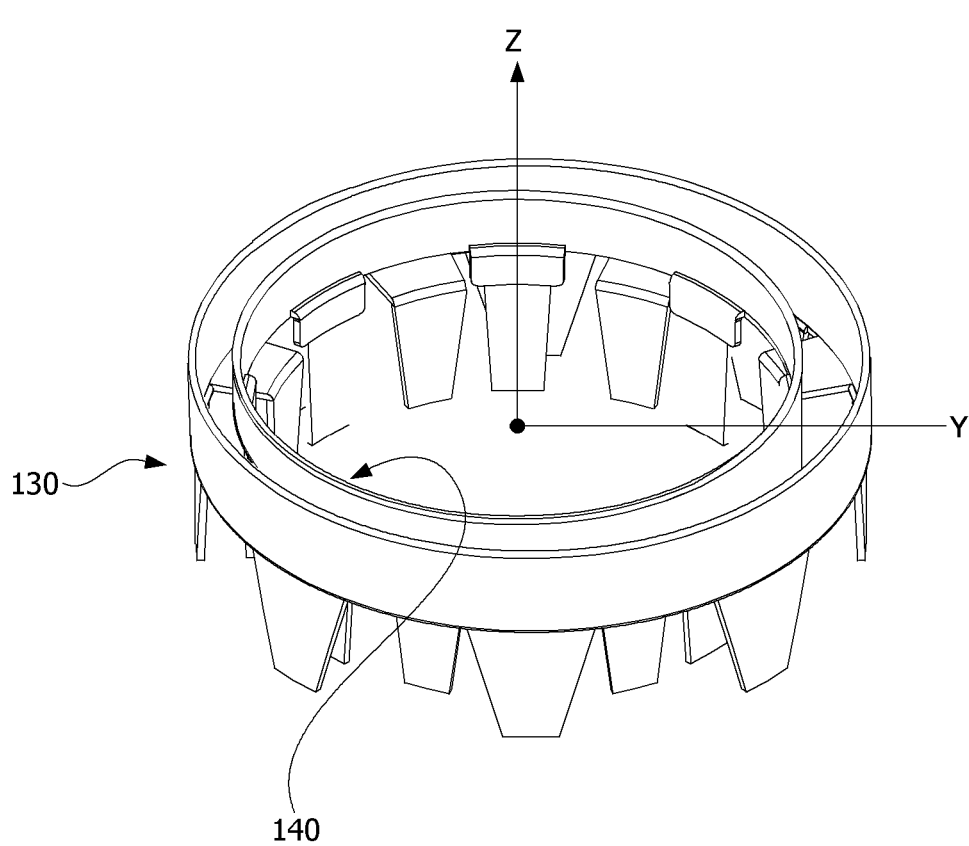

【FIG. 48】
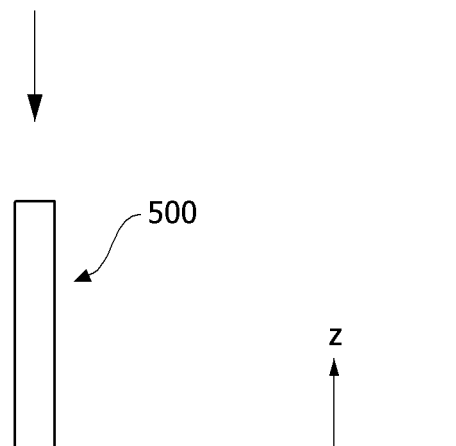

【FIG. 49】
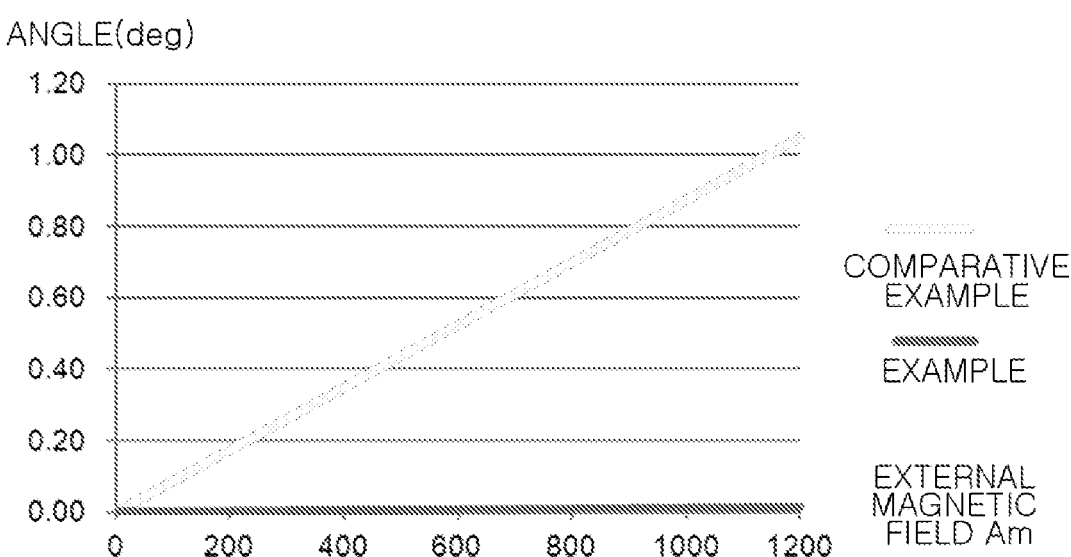

【FIG. 50】
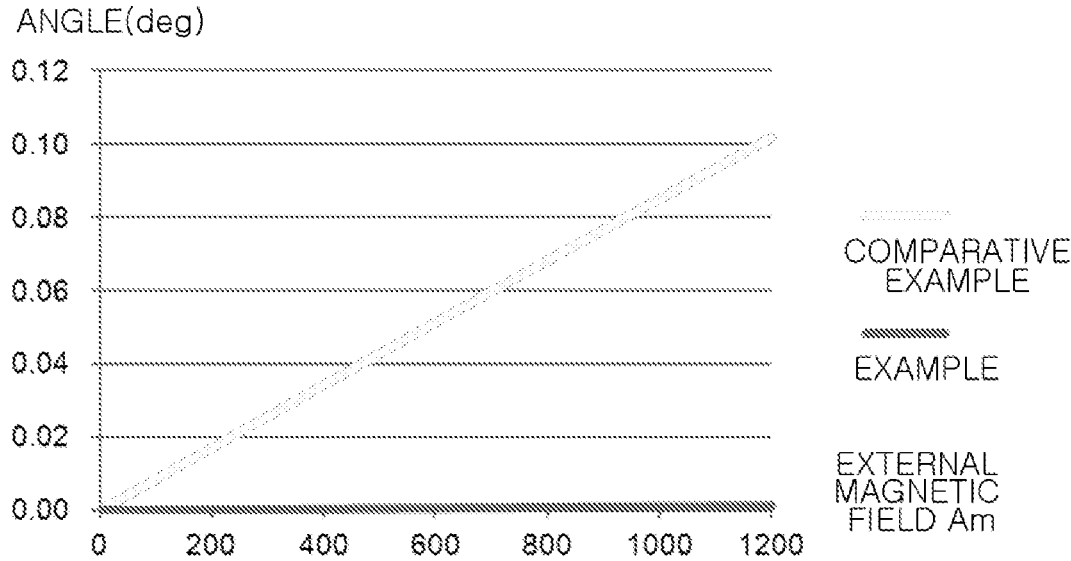

SENSING DEVICE

CROSS-REFERENCE TO RELATED PATENT APPLICATIONS

This application is a U.S. National Stage Application under 35 U.S.C. § 371 of PCT Application No. PCT/KR2020/018672, filed Dec. 18, 2020, which claims priority to Korean Patent Application Nos. 10-2019-0173175, filed Dec. 23, 2019 and 10-2020-0002744, filed Jan. 8, 2020, whose entire disclosures are hereby incorporated by reference.

TECHNICAL FIELD

Embodiments relate to a sensing device.

BACKGROUND ART

A power steering system (hereinafter referred to as an electronic power system (EPS)) drives a motor through an electronic control unit according to driving conditions to ensure turning stability and provide a quick restoring force, thereby enabling a driver to drive safely.

In order to provide appropriate torque, an EPS includes a sensor assembly that measures a torque, a steering angle, and the like of a steering shaft. The sensor assembly may include a torque sensor for measuring torque applied to the steering shaft and an index sensor for measuring angular acceleration of the steering shaft. The steering shaft may include an input shaft connected to a steering wheel, an output shaft connected to a power transmission component at a wheel side, and a torsion bar connecting the input shaft and the output shaft.

The torque sensor measures a degree of torsion of the torsion bar to measure the torque applied to the steering shaft. The index sensor detects the rotation of the output shaft to measure the angular acceleration of the steering shaft. In the sensor assembly, both the torque sensor and the index sensor may be disposed and integrally formed.

The torque sensor may include a housing, a rotor, a stator including a stator tooth, and a collector to measure the torque.

In this case, the torque sensor may be provided in a magnetic type structure that is a structure in which the collector is disposed outside the stator tooth.

However, when an external magnetic field is generated, since the collector serves as a passage for the external magnetic field in the structure, there is a problem in that the external magnetic field affects a magnetic flux value of a Hall integrated circuit (IC). Accordingly, a change occurs in an output value of the torque sensor, and thus there is a problem in that the degree of torsion of the torsion bar cannot be accurately measured.

In particular, since, as the number of electrical components increases in a vehicle, a case in which the torque sensor can be affected by an external magnetic field increases, there is a need for a torque sensor that is not affected by an external magnetic field.

In addition, two collectors disposed to face each other in a radial direction may be fixed to a housing. In this case, during a fusion process, a gap between an outer connector and an inner collector changes or a height of the collector changes, which may cause fatal problems in the performance of a sensor.

In addition, a boss of the housing provided for fusion is damaged, and thus there is a problem in that the collector is separated.

Meanwhile, protrusions disposed on a stator body are fused to couple a stator tooth to the stator body. In this case, since there are a plurality of fusion points, there are problems in that management is difficult and a manufacturing process is complicated.

DISCLOSURE

Technical Problem

The present invention is directed to providing a sensing device capable of avoiding magnetic field interference caused by an external magnetic field generated from the outside during torque measurement.

The present invention is also directed to providing a sensing device in which a collector is prevented from being deformed in a process of fixing the collector to a housing.

The present invention is also directed to providing a sensing device capable of constantly maintaining a gap between collectors or a height of the collector.

The present invention is also directed to providing a sensing device whose dimensional management can be facilitated and a manufacturing process can be simplified when a stator tooth is coupled to a stator body.

Objectives to be solved by embodiments are not limited to the above-described objectives, and other objectives, which are not described above, may be clearly understood by those skilled in the art through the following specification.

Technical Solution

According to an embodiment of the present invention, a sensing device includes a stator including a stator tooth, and a rotor including a magnet, wherein the stator tooth includes a first stator tooth and a second stator tooth disposed inside the first stator tooth, the first stator tooth includes a plurality of first teeth, the second stator tooth includes a plurality of second teeth, the first tooth overlaps the second tooth in a radial direction with respect to a center of the stator, the sensing device further includes a first sensor and a collector disposed between the first stator tooth and the second stator tooth in the radial direction, the collector includes a first collector and a second collector disposed inside the first collector, the first sensor is disposed between the first collector having a ring shape and the second collector having a ring shape in the radial direction, each of the first collector and the second collector includes a body disposed to face the first sensor and an extension portion extending from the body, the extension portion includes a protrusion protruding from one side edge of the extension portion in an axial direction, and the protrusion includes areas having different circumferential widths.

The sensing device may further include a housing, and the housing may include a groove portion in which the protrusion is disposed.

The protrusion may include a first protrusion protruding from the extension portion and a second protrusion extending from the first protrusion, and a circumferential width of the second protrusion may be greater than a circumferential width of the first protrusion.

The groove portion may include a first groove in which the first protrusion is disposed, and a second groove which extends from the first groove and in which the second protrusion is disposed.

The housing may include a third protrusion, the third protrusion may be disposed to overlap the first collector and the second collector in the axial direction, and the groove portion may be disposed in the third protrusion.

One side edge of the extension portion may be in contact with the third protrusion in the axial direction.

The housing may include a fourth protrusion, a portion of the protrusion may be in contact with the fourth protrusion to not be exposed, and the rest of the protrusion may be disposed to be exposed.

The third protrusion may be disposed between the first stator tooth and the second stator tooth in the radial direction.

The housing may include a fifth protrusion protruding from the third protrusion, and the fifth protrusion may be disposed between the first collector and the second collector.

An outer surface of the third protrusion may be in contact with an inner surface of the extension portion of the first collector, and an inner surface of the third protrusion may be in contact with an outer surface of the extension portion of the second collector.

According to an embodiment of the present invention, a sensing device includes a stator, and a rotor disposed in the stator, wherein the stator includes a stator holder, a stator body coupled to the stator holder, and a stator tooth disposed in the stator body, the stator body includes an outer portion and an inner portion disposed inside the outer portion, the stator tooth includes a first stator tooth and a second stator tooth disposed inside the first stator tooth, the first stator tooth includes a plurality of first teeth, the second stator tooth includes a plurality of second teeth, the first tooth overlaps the second tooth in a radial direction with respect to a center of the stator, the first tooth is disposed to overlap the outer portion in a circumferential direction with respect to the center of the stator, the second tooth is disposed to overlap the inner portion in the circumferential direction with respect to the center of the stator, and the first tooth and the second tooth are disposed to be exposed from the stator body. The first stator tooth may include a first body, the first tooth may be disposed to protrude from the first body, the first body may be disposed to overlap the outer portion in the circumferential direction with respect to the center of the stator, and at least a portion of the first body may be disposed to be exposed from the stator body.

The second stator tooth may include a second body, the second tooth may be disposed to protrude from the second body, the second body may be disposed to overlap the inner portion in the circumferential direction with respect to the center of the stator, and at least a portion of the second body may be disposed to be exposed from the stator body.

The first stator tooth may include a plurality of third teeth, and the third tooth may be disposed to overlap the inner portion in the circumferential direction with respect to the center of the stator and may be disposed to be exposed from the stator body.

The first stator tooth may include a first body from which the first tooth protrudes, an extension portion protruding inward from the first body, and a third tooth connected to the extension portion, the stator body may include a diaphragm configured to connect the outer portion and the inner portion, and the extension portion may be disposed to overlap the diaphragm in a circumferential direction with respect to the center of the stator and may be disposed to be exposed from the stator body.

According to an embodiment of the present invention, a sensing device includes a stator, and a rotor disposed in the stator, wherein the stator includes a stator holder, a stator body coupled to the stator holder, and a stator tooth disposed in the stator body, the stator body includes an outer portion and an inner portion disposed inside the outer portion, the stator tooth includes a first stator tooth and a second stator tooth disposed inside the first stator tooth, the first stator tooth includes a plurality of first teeth, the second stator tooth includes a plurality of second teeth, the first tooth overlaps the second tooth in a radial direction with respect to a center of the stator, each of the outer portion and the inner portion includes a plurality of first side portions, the first side portions are disposed at intervals in the circumferential direction with respect to the center of the stator, and the first tooth and the second tooth are each disposed between the first side portions in the circumferential direction with respect to the center of the stator to be in contact with the first side portions.

The stator body may include a plurality of second side portions, the second side portions may be disposed at intervals in the circumferential direction with respect to the center of the stator, the first stator tooth may include a first body, the first tooth may be disposed to protrude from the first body, and the first body may be in contact with the second side portion.

The stator body may include a third side portion in contact with the first body, and the third side portion may connect the plurality of second side portions.

The first stator tooth may include a plurality of third teeth, and the third tooth may be disposed between the first side portions in the circumferential direction with respect to the center of the stator to be in contact with the first side portions.

The first stator tooth may include a first body from which the first tooth protrudes, an extension portion protruding inward from the first body, and a third tooth connected to the extension portion, the stator body may include a diaphragm connecting the outer portion and the inner portion, the diaphragm may include a plurality of walls, and the extension portion may be disposed between the walls in the circumferential direction with respect to the center of the stator to be in contact with the wall.

The outer portion may include a first contact surface of the stator body in contact with one side surface of the first tooth and a second contact surface of the stator body in contact with the other side surface of the first tooth, and the outer portion may include an area in which a circumferential width between the first contact surface and the second contact surface gradually decreases toward an end of the first contact surface and an end of the second contact surface in an axial direction.

The inner portion may include a third contact surface of the stator body in contact with one side surface of the second tooth and a fourth contact surface of the stator body in contact with the other side surface of the second tooth, and the inner portion may include an area in which a circumferential width between the third contact surface and the fourth contact surface gradually decreases toward an end of the third contact surface and an end of the fourth contact surface in the axial direction.

At least one of the first stator tooth and the second stator tooth may include a plurality of protrusions, and the protrusions may be disposed to overlap the stator body in the circumferential direction with respect to the center of the stator.

Advantageous Effects

In a sensing device having the above configuration according to embodiments, since collectors are disposed between one pair of stator teeth and a sensor is disposed between the collectors, it is possible to prevent or minimize magnetic field interference caused by an external magnetic field generated from the outside during torque measurement.

In addition, a first tooth of a first stator tooth and a second tooth of a second stator tooth disposed apart from each other are disposed to overlap each other in a radial direction, and a magnet is rotated between the first tooth and the second tooth, thereby charging the first tooth and the second tooth to have different poles.

In addition, there is an advantage in that a magnitude of a collected flux can be increased.

Furthermore, it is possible to prevent or minimize magnetic field interference caused by an external magnetic field that is generated to flow from the inside of a stator holder.

In addition, it is possible to prevent or minimize magnetic field interference caused by an external magnetic field introduced through a side surface of a sensing device.

Furthermore, in a process of fixing a collector to a housing, deformation of the collector is prevented, thereby securing the performance of a sensor. In particular, a gap between collectors in a radial direction is maintained without change and a height of the collector is constantly maintained in an axial direction, thereby securing the performance of a sensing device.

In addition, there is an advantage in that a collector can be prevented from being separated from a housing.

Furthermore, according to embodiments, there are advantages in that dimensional management is facilitated and a manufacturing process is simplified when a stator tooth is coupled to a stator body.

Furthermore, according to embodiments, there is an advantage in that the deformation of a stator due to injection pressure is prevented when a stator tooth and a stator body are insert-molded.

In addition, according to embodiments, there is an advantage in that a stator tooth can be prevented from being separated from a stator body in an axial direction.

Various useful advantages and effects of embodiments may not be limited to the above-described effects and may be more easily understood through a process in which specific embodiments of the present invention are described.

DESCRIPTION OF DRAWINGS

FIG. 1 is an exploded perspective view illustrating a sensing device according to an embodiment.

FIG. 2 is a perspective view illustrating a stator of the sensing device according to the embodiment.

FIG. 3 is a cross-sectional view illustrating the stator of the sensing device according to the embodiment.

FIG. 4 is a plan view illustrating a stator body of the stator.

FIGS. 5 and 6 are cross-sectional views illustrating the stator body of the stator.

FIG. 7 is a side view illustrating a first stator tooth.

FIG. 8 is a side view illustrating a second stator tooth.

FIG. 9 is a plan view illustrating the first stator tooth, the second stator tooth, and a magnet.

FIG. 10 is a view illustrating a first pole and a second pole of the magnet.

FIG. 11 is a view illustrating a second angle.

FIG. 12 is a view illustrating a third angle.

FIG. 13 is a graph showing a flux according to a first angle, the second angle, and the third angle.

FIG. 14 is a perspective view illustrating an arrangement of the magnet with respect to the first stator tooth and the second stator tooth.

FIG. 15 is a perspective view illustrating the first stator tooth.

FIG. 16 is a perspective view illustrating the second stator tooth.

FIG. 17 is a plan view of the first stator tooth.

FIG. 18 is a plan view of the first stator tooth and the second stator tooth.

FIG. 19 is a view illustrating the first tooth, the second tooth, and a third tooth disposed on concentric circles.

FIG. 20 is a plan view of the first stator tooth and the second stator tooth which illustrates a flow of an external magnetic field introduced through the inside of a stator holder.

FIG. 21 is a cross-sectional view of the first stator tooth which illustrates a flow of an external magnetic field guided to the third tooth.

FIG. 22 is a perspective view illustrating a first collector.

FIG. 23 is a perspective view illustrating a second collector.

FIG. 24 is a plan view of the first collector, the second collector, and a first sensor.

FIG. 25 is a view illustrating stator teeth and an external magnetic field avoidance state.

FIG. 26 is a view illustrating a housing and a collector.

FIG. 27 is a view illustrating the housing.

FIG. 28 is an enlarged view of a groove portion formed in the housing.

FIG. 29 is a cross-sectional view of the housing and the collector along line G1-G1 of FIG. 26.

FIG. 30 is a cross-sectional view of the housing and the collector along line G2-G2 of FIG. 26.

FIG. 31 is a view illustrating a collector disposed in a housing according to a modified example.

FIG. 32 is a view illustrating the housing according to the modified example.

FIG. 33 is an enlarged view of a groove portion formed in the housing shown in FIG. 32.

FIG. 34 is a cross-sectional view of the housing and the collector along line G3-G3 of FIG. 31.

FIG. 35 is a cross-sectional view of the housing and the collector along line G4-G4 of FIG. 31.

FIG. 36 is a view illustrating a first gear and a second gear which are engaged with a main gear.

FIG. 37 is a view illustrating a stator of a sensing device according to a second embodiment.

FIG. 38 is a perspective view illustrating a first collector.

FIG. 39 is a perspective view illustrating a second collector.

FIG. 40 is a view illustrating the stator.

FIG. 41 is a cross-sectional view along line A-A.

FIG. 42 is a cross-sectional view along line B-B.

FIG. 43 is a perspective view illustrating a stator body.

FIG. 44 is a plan view illustrating the stator body.

FIG. 45 is a view illustrating a first contact surface and a second contact surface of an outer portion of the stator body.

FIG. 46 is a view illustrating a third contact surface and a fourth contact surface of an inner portion of the stator body.

FIG. 47 is a view illustrating directionality of an external magnetic field with respect to stator teeth.

FIG. 48 is a view illustrating an avoidance state of a first sensor with respect to an external magnetic field having z-axis directionality.

FIG. 49 is a graph showing a comparison between changes in angle of Comparative Example and Example in response to an external magnetic field in a z-axis direction.

FIG. 50 is a graph showing a comparison between changes in angle of Comparative Example and Example according to an external magnetic field in a y'-axis direction.

MODES OF THE INVENTION

Hereinafter, exemplary embodiments of the present invention will be described in detail with reference to the accompanying drawings.

However, the technical spirit of the present invention is not limited to some embodiments disclosed below but can be implemented in various different forms. Without departing from the technical spirit of the present invention, one or more of components may be selectively combined and substituted to be used between the embodiments.

Also, unless defined otherwise, terms (including technical and scientific terms) used herein may be interpreted as having the same meaning as commonly understood by one of ordinary skill in the art to which the present invention belongs. General terms like those defined in a dictionary may be interpreted in consideration of the contextual meaning of the related technology.

Furthermore, the terms used herein are intended to illustrate embodiments but are not intended to limit the present invention.

In the present specification, the terms expressed in the singular form may include the plural form unless otherwise specified. When "at least one (or one or more) of A, B, and C" is expressed, it may include one or more of all possible combinations of A, B, and C.

In addition, terms such as "first," "second," "A," "B," "(a)," and "(b)" may be used herein to describe components of the embodiments of the present invention.

Each of the terms is not used to define an essence, order, or sequence of a corresponding component but used merely to distinguish the corresponding component from other components.

In a case in which one component is described as being "connected," "coupled," or "joined" to another component, such a description may include both a case in which one component is "connected," "coupled," and "joined" directly to another component and a case in which one component is "connected," "coupled," and "joined" to another component with still another component disposed between the one component and another component.

In addition, in a case in which any one component is described as being formed or disposed "on (or under)" another component, such a description includes both a case in which the two components are formed in direct contact with each other and a case in which the two components are in indirect contact with each other such that one or more other components are interposed between the two components. In addition, in a case in which one component is described as being formed "on (or under)" another component, such a description may include a case in which the one component is formed at an upper side or a lower side with respect to another component.

Hereinafter, embodiments according to the present invention will be described in detail with reference to the accompanying drawings, and the same or corresponding constituent elements are denoted by the same reference numerals regardless of a sign of the drawing, and repeated descriptions thereof will be omitted.

FIG. 1 is an exploded perspective view illustrating a sensing device according to an embodiment, and FIG. 2 is a perspective view illustrating a stator of the sensing device according to the embodiment. In FIGS. 1 and 2, a z-direction is an axial direction, and a y-direction is a radial direction. The axial direction and the radial direction are perpendicular to each other.

Referring to FIGS. 1 and 2, the sensing device according to a first embodiment may include a stator 100, a rotor 200 partially disposed in the stator 100, a first sensor 500, a circuit board 600 electrically connected to the first sensor 500, and a housing 700 to which the circuit board 600 is coupled.

Here, the stator 100 may be connected to an output shaft (not shown), and the rotor 200, of which at least a portion is rotatably disposed in the stator 100, may be connected to an input shaft (not shown), but the present invention is not necessarily limited thereto.

In this case, the rotor 200 may be disposed to be rotatable with respect to the stator 100. Hereinafter, an inner side may be a side in a direction toward a center C in the radial direction, and an outer side may be a side in a direction opposite to the inner side.

FIG. 3 is a cross-sectional view illustrating the stator of the sensing device according to the embodiment.

The stator 100 may be connected to an output shaft (not shown) of a steering shaft.

Referring to FIGS. 1 to 3, the stator 100 may include a stator holder 110, a stator body 120, a first stator tooth 130, and a second stator tooth 140.

The stator holder 110 may be connected to an output shaft of an electrical steering device. Accordingly, the stator holder 110 may rotate in conjunction with the rotation of the output shaft. The stator holder 110 may be formed in a cylindrical shape. The stator holder 110 may be formed of a metal material, but the present invention is not necessarily limited thereto. Of course, another material may be used for the stator holder 110 in consideration of a strength of a certain level or more such that the output shaft may be fixedly fitted thereinto.

The stator holder 110 may include a groove 111. The groove 111 is concavely formed in an outer circumferential surface of the stator holder 110. The groove 111 is formed along the outer circumferential surface of the stator holder 110. A separate fixing member may be inserted into the groove 111.

The stator holder 110 may be coupled to the stator body 120.

The stator body 120 may be disposed at one end portion of the stator holder 110. The stator body 120 may be coupled to the stator holder 110 through an insert injection molding method using a resin such as a synthetic resin. A main gear 120*a* may be formed on an outer circumferential surface of the stator body 120. The main gear 120*a* transfers a rotational force of the stator 100 to a first gear 10 (see FIG. 36) and a second gear 20 (see FIG. 36).

The first stator tooth 130 and the second stator tooth 140 may be disposed apart from each other in the radial direction. The first stator tooth 130 and the second stator tooth 140 may be fixed to the stator body 120. The first stator tooth 130 includes a first body 131, a first tooth 132, and a third tooth 133. The second stator tooth 140 includes a second body 141 and a second tooth 142.

FIG. 4 is a plan view illustrating the stator body of the stator, and FIGS. 5 and 6 are cross-sectional views illustrating the stator body of the stator.

Referring to FIGS. 4 to 6, the stator body 120 includes an inner portion 121, an outer portion 122, and a diaphragm 123. The inner portion 121 and the outer portion 122 have a cylindrical shape. The outer portion 122 is disposed outside the inner portion 121 to be spaced apart from the inner portion 121 in the radial direction. The diaphragm 123 connects the inner portion 121 and the outer portion 122. The inner portion 121, the outer portion 122, and the diaphragm 123 may be integrated. The stator holder 110 may be coupled to an inner side of the inner portion 121. A space S may be formed between the outer portion 122 and the inner portion 121. The diaphragm 123 may be formed in a plate shape. The diaphragm 123 may be disposed between the inner portion 121 and the outer portion 122.

The space S may be divided into a first space S1 and a second space S2 by the diaphragm 123. The first sensor 500 may be disposed in the first space S1, and a magnet 230 may be disposed in the second space S2. The diaphragm 123 may be disposed below a virtual horizontal line L1. Here, the virtual horizontal line L1 passes through a center of the outer portion 122 with respect to the axial direction.

Meanwhile, the diaphragm 123 may include first holes 124 and second holes 125. The first hole 124 and the second hole 125 are for arranging the first stator tooth 130 and the second stator tooth 140.

The first body 131 and the second body 141 may be disposed in the first space S1. The first tooth 132 and the second tooth 142 may be disposed in the second space S2.

The plurality of first holes 124 may be formed apart from each other in a circumferential direction. The first tooth 132 passes through the first hole 124 to be disposed in the second space S2. In this case, the number of the first holes 124 is the same as the number of the first teeth 132. The first hole 124 may be disposed adjacent to an inner circumferential surface of the outer portion 122. As shown in FIG. 6, the first hole 124 may be formed in the diaphragm 123 to be in contact with the inner circumferential surface of the outer portion 122.

The plurality of second holes 125 may be formed apart from each other in the circumferential direction. In this case, the second hole 125 may be disposed inside the first hole 124 to be spaced apart from the first hole 124 in the radial direction. The second tooth 142 passes through the second hole 125 to be disposed in the second space S2. In this case, the number of the second holes 125 is the same as the number of the second teeth 142 of the second stator tooth 140. The second hole 125 may be disposed adjacent to an outer circumferential surface of the inner portion 121. The second hole 125 may be formed in the diaphragm 123 to be in contact with the outer circumferential surface of the inner portion 121.

A plurality of third holes 127 may be formed apart from each other in the circumferential direction. The third hole 127 may be disposed between the second holes 125 in the circumferential direction. The third tooth 133 passes through the third hole 127 to be disposed in the second space S2. In this case, the number of the third holes 127 may be the same as the number of the third teeth 133 of the first stator tooth 130. The third hole 127 may be disposed adjacent to the outer circumferential surface of the inner portion 121. The third hole 127 may be formed in the diaphragm 123 to be in contact with the outer circumferential surface of the inner portion 121.

The first stator tooth 130 and the second stator tooth 140 may be disposed between the outer circumferential surface of the inner portion 121 of the stator body 120 and the inner circumferential surface of the outer portion 122 thereof. Here, the first stator tooth 130 and the second stator tooth 140 may be formed of a metal material for charging through rotation of the magnet 230.

The first stator tooth 130 may be fixed to the inner circumferential surface of the outer portion 122 through an adhesive member (not shown) such as glue, and the second stator tooth 140 may be fixed to the outer circumferential surface of the inner portion 121 through an adhesive member (not shown) such as glue, but the present invention is not necessarily limited thereto. For example, each of the first stator tooth 130 and the second stator tooth 140 may be fixed to the stator body 120 through a coupling member (not shown) or a calking method.

A boss 126 is disposed to extend downward from the diaphragm 123. A sidewall of the boss 126 and the outer portion 122 are spaced apart from each other to form a first slot U1. The first tooth 132 is inserted into the first slot U1 and passes through the first hole 124 to be positioned in the second space S2. The sidewall of the boss 126 and the inner portion 121 are spaced apart from each other to form a second slot U2. The second tooth 142 and the third tooth 133 are inserted into the second slot U2 and respectively pass through the second hole 125 and the third hole 127 to be positioned in the second space S2.

The first slot U1 guides the first tooth 132 to the first hole 124 to facilitate coupling in a process in which the first stator tooth 130 is coupled to the stator body 120.

The second slot U2 respectively guides the second tooth 142 and the third tooth 133 to the second hole 125 and the third hole 127 to facilitate coupling in a process in which the second stator tooth 140 is coupled to the stator body 120.

FIG. 7 is a side view illustrating the first stator tooth, and FIG. 8 is a side view illustrating the second stator tooth.

Referring to FIGS. 2 and 7, the first stator tooth 130 may include the first body 131 and the plurality of first teeth 132 which are spaced apart from each other and protrude from the first body 131 in the axial direction.

Referring to FIGS. 2 and 8, the second stator tooth 140 may include the second body 141 and the plurality of second teeth 142 which are spaced apart from each other and protrude from the second body 141 in the axial direction.

A height H1 of the first body 131 is smaller than a height H2 of the first tooth 132 with respect to an upper surface 131*a* of the first body 131. A height H3 of the second body 141 is smaller than a height H4 of the second tooth 142 with respect to an upper surface 141*a* of the second body 141. However, the present invention is not limited thereto, and the height H2 of the first tooth 132 may be different from the height H4 of the second tooth 142.

FIG. 9 is a plan view illustrating the first stator tooth, the second stator tooth, and the magnet.

Referring to FIG. 9, the first stator tooth 130 is disposed outside the second stator tooth 140. When viewed in the radial direction (y-direction), the first tooth 132 and the second tooth 142 may be disposed to overlap in the radial direction. Such an arrangement of the first tooth 132 and the second tooth 142 has an effect of reducing a leakage of a magnetic flux.

FIG. 10 is a view illustrating a first pole and a second pole of the magnet.

Referring to FIG. 10, the magnet includes a first pole 230A and a second pole 230B. The first pole 230A and the second pole 230B may be alternately disposed in a circumferential direction of the magnet.

The first pole 230A and the second pole 230B may each include an N-pole area NA and an S-pole area SA. The first pole 230A and the second pole 230B may each have a multi-layered structure in which the N-pole area NA and the S-pole area SA are separated as inner and outer portions.

In the first pole 230A, the N-pole area NA may be disposed at a relatively outer side, and the S-pole area SA may be disposed inside the N-pole area NA. In the second pole 230B, the N-pole area NA may be disposed at a relatively inner side, and the S-pole area SA may be disposed outside the N-pole area NA.

The N-pole area NA of the first pole 230A and the S-pole area SA of the second pole 230B are disposed adjacent to each other. The S-pole area SA of the first pole 230A and the N-pole area NA of the second pole 230B are disposed adjacent to each other.

When the magnet 230 rotates and thus the first tooth 132 approaches the S-pole area SA to be charged with the S-pole, since the second tooth 142 approaches the N-pole area NA, the second tooth 142 is charged with the N-pole. Alternatively, when the magnet 230 rotates and the first tooth 132 approaches the N-pole area NA to be charged into the N-pole, since the second tooth 142 approaches the S-pole area SA, the second tooth 142 is charged into the S-pole. Accordingly, the first sensor 500 may measure an angle through a magnetic field applied through the first stator tooth 130, the second stator tooth 140, and a collector 800 (see FIG. 22).

In the sensing device according to the embodiment, the first tooth 132 and the second tooth 142 overlap each other in the radial direction. Both ends of the second tooth 142 may overlap the first tooth 132. For example, in designing the positions and sizes of the first tooth 132 and the second tooth 142, a first angle $\theta 1$, a second angle $\theta 2$ (see FIG. 11), and a third angle $\theta 3$ (FIG. 12) may be the same.

The first angle $\theta 1$ represents an angle formed by both ends of the first pole 230A with respect to a stator center C. For example, when there are eight first poles 230A and eight second poles 230B, the first angle $\theta 1$ may be 22.5°.

FIG. 11 is a view illustrating the second angle $\theta 2$, and FIG. 12 is a view illustrating the third angle $\theta 3$.

Referring to FIG. 11, the second angle $\theta 2$ represents an angle formed by both ends P1 of the first tooth 132 with respect to a stator center C. In the axial direction, a reference point G defining both ends P1 of the first tooth 132 is as follows. When the first tooth 132 is disposed to face a body 231 of the magnet 230, the reference point G corresponds to a point of the first tooth 132 corresponding to a midpoint of a height H1 of the body 231 of the magnet 230. The height H1 of the body 231 of the magnet 230 means a height formed between an upper surface 231$a$ and a lower surface 231$b$ of the magnet 230 in the axial direction. An angle $\theta 4$ between the first teeth 132 at the reference point G may be the same as the second angle $\theta 2$.

Referring to FIG. 12, the third angle $\theta 3$ represents an angle formed by both ends P2 of the second tooth 142 with respect to a stator center C. In the axial direction, a reference point G defining both ends P2 of the second tooth 142 is as follows. When the second tooth 142 is disposed to face the body 231 of the magnet 230, the reference point G corresponds to a point of the second tooth 142 corresponding to a midpoint of the height H1 of the body 231 of the magnet 230. An angle $\theta 5$ between the second teeth 142 at the reference point G may be the same as the third angle $\theta 3$.

FIG. 13 is a graph showing a flux according to the first angle $\theta 1$, the second angle $\theta 2$, and the third angle $\theta 3$.

Referring to FIG. 13, in a state in which the second angle $\theta 2$ and the third angle $\theta 3$ are set to be the same, it can be confirmed that, as the second angle $\theta 2$ and the third angle $\theta 3$ are closer to the first angle $\theta 1$, a magnitude of the flux increases, and as the second angle $\theta 2$ and the third angle $\theta 3$ are farther from the first angle $\theta 1$, the magnitude of the flux decreases. When the sizes and positions of the first tooth 132 and the second tooth 142 are aligned such that the second angle $\theta 2$ and the third angle $\theta 3$ are the same as the first angle $\theta 1$, it can be seen that a magnitude of a flux of the first and second stator teeth 130 and 140 is the greatest.

Referring to FIG. 1, the rotor 200 may include a rotor holder 210, a rotor body 220, and the magnet 230. The rotor holder 210, the rotor body 220, and the magnet 230 may be integrated.

The rotor holder 210 may be connected to an input shaft of the electrical steering device. Accordingly, the rotor holder 210 may rotate in conjunction with the rotation of the input shaft. The rotor holder 210 may be formed in a cylindrical shape. An end portion of the rotor holder 210 may be coupled to the rotor body 220. The rotor holder 210 may be formed of a metal material, but the present invention is not necessarily limited thereto. Of course, another material may be used for the rotor holder 210 in consideration of a strength of a certain level or more such that the input shaft may be fixedly fitted thereinto.

The rotor body 220 is disposed at one side of an outer circumferential surface of the rotor holder 210. The rotor body 220 may be an annular member.

The magnet 230 is coupled to the rotor body 220. The magnet 230 rotates in conjunction with the rotor holder 210 when the rotor holder 210 rotates.

FIG. 14 is a perspective view illustrating an arrangement of the magnet with respect to the first stator tooth and the second stator tooth.

Referring to FIG. 14, the magnet 230 is disposed between the first tooth 132 and the second tooth 142. The magnet 230 is disposed between the third tooth 133 and the first tooth 132.

The body 231 of the magnet 230 is disposed to face the first tooth 132, the second tooth 142, and the third tooth 133. Protrusions 232 of the magnet 230 are disposed above the first tooth 132, the second tooth 142, and the third tooth 133.

FIG. 15 is a perspective view illustrating the first stator tooth.

Referring to FIG. 15, the first stator tooth 130 may include the first body 131, the first teeth 132, the third teeth 133, and extension portions 134. The first body 131 may be a ring-shaped member. The first teeth 132 may be disposed apart from each other in the circumferential direction and may extend upward from an upper portion of the first body 131. The first body 131 and the plurality of first teeth 132 may be integrally formed. The extension portion 134 protrudes inward from the first body 131. The third tooth 133 is connected to the extension portion 134.

The first tooth 132 and the third tooth 133 may be formed in a shape having a wide lower portion and a narrow upper portion. For example, when viewed in the radial direction, a width of a lower portion of each of the first tooth 132 and the third tooth 133 may be greater than a width of an upper portion thereof. Each of the first tooth 132 and the third tooth 133 may be formed in a trapezoidal shape. Since the first tooth 132 passes through the first hole 124 and the third tooth 133 passes through the third hole 127, an upper surface of the first body 131 and an upper surface of the extension portion 134 may be in contact with a lower surface of the diaphragm 123.

FIG. 16 is a perspective view illustrating the second stator tooth.

Referring to FIG. 16, the second stator tooth 140 may include the second body 141 and the second teeth 142. The second teeth 142 may be disposed apart from each other in the circumferential direction and may extend upward from an upper portion of the second body 141. The second body 141 and the plurality of second teeth 142 may be integrally formed. The second tooth 142 may be formed in a shape having a wide lower portion and a narrow upper portion. For example, when viewed in the radial direction, a width of a lower portion of the second tooth 142 may be greater than a width of an upper portion thereof. The second tooth 142 may have a trapezoidal shape.

The second body 141 may include a protrusion 141a. The protrusion 141a may be an annular member that is bent outward and protrudes further than the second tooth 142. The protrusion 141a reduces an air gap between the first sensor 500 and the second body 141 to increase an amount of flux applied to the first sensor 500.

FIG. 17 is a plan view of the first stator tooth.

Referring to FIG. 17, the shortest distance R1 from a center C of the first stator tooth 130 to the first tooth 132 is greater than the shortest distance R2 from the center C of the first stator tooth 130 to the third tooth 133. The third tooth 133 is disposed relatively closer to the center C of the first stator tooth 130 than the first tooth 132. This is to guide an external magnetic field introduced through the inside of the stator holder 110 to the third tooth 133.

FIG. 18 is a plan view of the first stator tooth and the second stator tooth.

Referring to FIG. 18, a diameter D3 formed by the plurality of third teeth 133 is smaller than a diameter D1 formed by the plurality of first teeth 132, and a diameter D2 formed by the plurality of second teeth 142 is smaller than the diameter D1 formed by the plurality of first teeth 132. With respect to the magnet 230, the first tooth 132 is disposed outside the magnet 230, and the second tooth 142 and the third tooth 133 are disposed inside the magnet 230.

FIG. 19 is a view illustrating the first tooth, the second tooth, and the third tooth disposed on concentric circles.

Referring to FIG. 19, the first tooth 132, the second tooth 142, and the third tooth 133 may be disposed on the concentric circles. The second tooth 142 and the third tooth 133 may be disposed on a first virtual circumference O1, and the first tooth 132 may be disposed on a second virtual circumference O2 different from the first virtual circumference O1. The second tooth 142 and the third tooth 133 may be alternately disposed in a circumferential direction of the stator 100. The first virtual circumference O1 is disposed inside the second virtual circumference 2. This is to disperse an external magnetic field introduced through the inside of the stator holder 110 in all directions through the second teeth 142 and the third teeth 133.

Meanwhile, a circumferential width t3 of a lower end of the third tooth 133 may be smaller than a circumferential width t1 of a lower end of the first tooth 132. In addition, the circumferential width t3 of the lower end of the third tooth 133 may be smaller than a circumferential width t2 of a lower end of the second tooth 142.

FIG. 20 is a plan view of the first stator tooth and the second stator tooth which illustrates a flow of an external magnetic field introduced through the inside of the stator holder, and FIG. 21 is a cross-sectional view of the first stator tooth which illustrates a flow of an external magnetic field guided to the third tooth.

Referring to FIG. 20, external magnetic fields W1 and W2 introduced along the stator holder 110 is introduced toward the first stator tooth 130 and the second stator tooth 140 in a radial direction of the stator 100. The external magnetic fields W1 and W2 are dispersed and guided to the third tooth 133 as well as the second tooth 142.

Referring to FIG. 21, an external magnetic field M1 introduced into the third tooth 133 is guided to the extension portion 134. In this case, the external magnetic field M1 introduced into the third tooth 133 may be canceled by the external magnetic field M2 that is introduced from the magnet 230 into the first tooth 132 and is guided to the extension portion 134. As described above, since an external magnetic field introduced along the stator holder 110 is guided to the first stator tooth 130 and canceled, there is an advantage in that an influence of the external magnetic field on the first sensor 500 can be significantly reduced.

<Table 1> below shows a comparison between torque of Comparative Example and torque of Example.

TABLE 1

|  | Torque (Nm) of Comparative Example 1 | Torque (Nm) of Example |
|---|---|---|
| Radial external magnetic field: 1,000 A/m | 0.41 Nm | 0.05 Nm |

Comparative Example relates to a sensing device not including a structure such as the third tooth 133. Example relates to a sensing device including the third tooth 133. When there is no external magnetic field in the radial direction, a torque of zero Nm is normal. When an external magnetic field of 1,000 A/m is applied in the radial direction in Comparative Example and Example, in the case of Comparative Example, a torque of 0.41 Nm is measured, and thus it can be seen that the sensing device is significantly affected by the external magnetic field. However, in the case of Example, a torque of 0.05 Nm is measured, and thus it can be seen that the sensing device is barely affected by the external magnetic field.

However, in the radial direction, a gap between the first and second stator teeth 130 and 140 and the first sensor 500 determines an amount of flux. When the gap between the first and second stator teeth 130 and 140 and the first sensor 500 decreases, a flux passing through the first sensor 500 decreases increases so that the sensitivity of a measured magnetic flux increases. On the other hand, when the gap between the first and second stator teeth 130 and 140 and the first sensor 500 increases a flux passing through the first sensor 500 increases so that the sensitivity of a measured magnetic flux decreases. Therefore, a wobble value may significantly increase according to a deviation in the gap between the first and second stator teeth 130 and 140 and the first sensor 500.

FIG. 22 is a perspective view illustrating a first collector, FIG. 23 is a perspective view illustrating a second collector, and FIG. 24 is a plan view of the first collector, the second collector, and the first sensor.

Referring to FIGS. 22 to 24, the collector 800 may include a first collector 810 and a second collector 820. Each of the first collector 810 and the second collector 820 collects a flux of the stator 100. The first collector 810 and the second collector 820 may be formed of a metal material. The first collector 810 and the second collector 820 are disposed apart from each other in the radial direction about the same center as a stator center C.

In the radial direction from the stator center C, the second collector 820 may be disposed inside the first collector 810. Each of the first collector 810 and the second collector 820 may be a ring-shaped member. Since each of the first collector 810 and the second collector 820 is the ring-shaped member, the collector 800 may cover an entire area of the first and second stator teeth 130 and 140 in a circumferential direction. As a result, in consideration of the entire area of the first and second stator teeth 130 and 140, the sensitivity of a measured magnetic flux according to a deviation in the gap between the first and second stator teeth 130 and 140 and the first sensor 500 is complementarily stabilized, and thus there is an advantage in that a wobble value increases.

The first collector 810 and the second collector 820 may include extension portions 811 and 821, first bodies 812 and 822, and second bodies 813 and 823, respectively. Each of the first bodies 812 and 822 and the second bodies 813 and 823 is disposed to face the first sensor 500. The second bodies 813 and 823 may extend from the first bodies 812 and 822. The extension portions 811 and 821 may extend from the first bodies 812 and 822 and the second bodies 813 and 823, respectively. Each of the first bodies 812 and 822 and the second bodies 813 and 823 may include a flat surface, and the extension portions 811 and 821 may include a curved surface. The extension portions 811 and 821 may include protrusions 814 and 824. The protrusions 814 and 824 protrude from one side edges of the extension portions 811 and 821. The protrusions 814 and 824 are for coupling the housing 700 and the collector 800.

A plurality of protrusions 814 and a plurality of protrusions 824 may be provided. Each of the protrusions 814 and 824 may include areas having different circumferential widths. For example, the protrusions 814 and 824 may include first protrusions 814a and 824a and second protrusions 814b and 824b. The first protrusions 814a and 824a protrude from the extension portions 811 and 821. The second protrusions 814b and 824b protrude from the first protrusions 814a and 824a. Circumferential widths K2 and K4 of the second protrusions 814b and 824b may be greater than circumferential widths K1 and K3 of the first protrusions 814a and 824a. The shapes of the protrusions 814 and 824 are for preventing the protrusions 814 and 824 from being separated from the housing 700 in the axial direction.

The first sensor 500 detects a change in magnetic field generated between the stator 100 and the rotor 200. The first sensor 500 may be a Hall integrated circuit (IC). The first sensor 500 detects an amount of magnetization of the stator 100 generated by an electrical interaction between the magnet 230 of the rotor 200 and the stator 100. The sensing device measures torque based on the detected amount of magnetization.

FIG. 25 is a view illustrating the stator teeth 130 and 140 and an external magnetic field avoidance state.

Referring to FIG. 25, the first collector 810 serves to block an external magnetic field introduced toward the first sensor 500 together with the first stator tooth 130.

An external magnetic field significantly affects the sensing device in a y'-axis direction. Here, the y'-axis direction is a direction toward the first sensor 500 in the radial direction perpendicular to the axial direction. Since an external magnetic field in the y'-axis direction is induced along the first stator tooth 130 and the second stator tooth 140 as denoted by S1 of FIG. 25, the external magnetic field in the y'-axis direction flows without affecting the first sensor 500. Therefore, the sensing device according to the embodiment has an advantage in that an influence of an external magnetic field on the first sensor 500 is small even in the y'-axis direction.

In addition, since an external magnetic field passing through the first stator tooth 130 to flow to the first sensor 500 may be induced by the first collector 810 as denoted by S2 of FIG. 25, the external magnetic field flows without affecting the first sensor 500 disposed inside the first collector 810. Therefore, the sensing device according to the embodiment has an advantage in that an influence of an external magnetic field on the first sensor 500 is small even in the y'-axis direction.

FIG. 26 is a view illustrating the housing 700 and the collector 800, and FIG. 27 is a view illustrating the housing 700.

Referring to FIGS. 26 and 27, the collector 800 is mounted in the housing 700.

The housing 700 may have a plate shape including an upper surface and a lower surface and may have a form of which upper and lower portions are open. A hole 701 is formed in a central portion of the housing 700. The stator holder 110 is positioned inside the hole 701. The circuit board 600 may be mounted on the lower surface of the housing 700. The first sensor 500 is mounted on the circuit board 600. The first sensor 500 may pass through the hole 701 of the housing 700 to be disposed on the upper surface of the housing 700. A separate cover may be coupled to a lower side of the housing 700 to cover the circuit board 600.

The housing 700 may include groove portions 710, a third protrusion 720, and fourth protrusions 730.

The third protrusion 720 may protrude from the upper surface of the housing 700 in the axial direction. The third protrusion 720 may be disposed along a circumference of the hole 701. The third protrusion 720 may be an arc-shaped member. A portion of the third protrusion 720 may be disposed between the first collector 810 and the second collector 820 in the radial direction. The entire third protrusion 720 may be disposed between the first stator tooth 130 and the second stator tooth 140 in the radial direction. An upper surface of the third protrusion 720 may be in contact with a lower surface of the first collector 810 and a lower surface of the second collector 820.

The fourth protrusion 730 may protrude from the upper surface of the housing 700 in the axial direction. The fourth protrusions 730 may be disposed inside and outside the third protrusion 720.

The groove portion 710 is concavely formed in the third protrusion 720. The groove portions 710 may be formed to be concave from an upper surface and an inner circumferential surface of the third protrusion 720 or may be formed to be concave from the upper surface and an outer circumferential surface of the third protrusion 720. The protrusions 814 and 824 of the collector 800 are inserted into the groove portions 710. The groove portion 710 may include a first groove 711 and a second groove 712. The first protrusions 814a and 824a of the protrusions 814 and 824 are disposed in the first groove 711, and the second protrusions 814b and 824b of the protrusions 814 and 824 are disposed in the second groove 712. When the protrusions 814 and 824 are disposed in the groove portion 710, the second protrusions 814b and 824b are caught in the first groove 711 in the axial direction, thereby preventing the collector 800 from being separated from the housing 700 in the axial direction.

FIG. 28 is an enlarged view of the groove portion 710 formed in the housing 700.

Referring to FIGS. 27 and 28, the groove portion 710 in which the protrusion 814 of the first collector 810 is disposed may be formed to correspond to the groove portion 710 in which the protrusion 824 of the second collector 800 is disposed. The groove portion 710 in which the protrusion 814 of the first collector 810 is disposed may be formed adjacent to the outer circumferential surface of the third protrusion 720. The groove portion 710 in which the protrusion 824 of the second collector 810 is disposed may be formed adjacent to the inner circumferential surface of the third protrusion 720.

The fourth protrusions 730 are disposed adjacent to the groove portions 710 inside and outside the third protrusion 720.

FIG. 29 is a cross-sectional view of the housing 700 and the collector 800 along line G1-G1 of FIG. 26, and FIG. 30 is a cross-sectional view of the housing 700 and the collector 800 along line G2-G2 of FIG. 26.

Referring to FIGS. 26 and 29, each of the first collector 810 and the second collector 820 is seated on the third protrusion 720. The third protrusion 720 is disposed to overlap the first collector 810 and the second collector 820 in the axial direction. Accordingly, one side edge of the extension portion 811 of the first collector 810 and one side edge of the extension portion 821 of the second collector 820 are in contact with the upper surface of the third protrusion 720.

Referring to FIGS. 26 and 30, as shown in FIG. 29, in a state in which each of the first collector 810 and the second collector 820 is seated on the third protrusion 720, the protrusions 814 and 824 are disposed in the groove portions 710. Portions of the protrusions 814 and 824 may be in contact with the fourth protrusions 730 to not be exposed, and the remaining portions F of the protrusions 814 and 824 may be disposed to be exposed to the outside. The fourth protrusions 730 support portions of the protrusions 814 and 824 in the radial direction.

FIG. 31 is a view illustrating a collector 800 disposed in a housing 700 according to a modified example, FIG. 32 is a view illustrating the housing 700 according to the modified example, and FIG. 33 is an enlarged view of a groove portion 710 disposed in the housing 700 shown in FIG. 32.

The housing 700 according to the modified example may additionally include a fifth protrusion 750.

The fifth protrusion 750 may protrude from an upper surface of a third protrusion 720 in an axial direction. The fifth protrusion 750 may be an arc-shaped member. The fifth protrusion 750 may be disposed between a first collector 810 and a second collector 820 in a radial direction.

The groove portion 710 of the housing 700 according to the modified example may be formed to be concave from the upper surface of the third protrusion 720. The groove portion 710 in which a protrusion 814 of the first collector 810 is disposed may be disposed outside the fifth protrusion 750, and the groove portion 710 in which a protrusion 824 of the second collector 820 may be disposed inside the fifth protrusion 750.

FIG. 34 is a cross-sectional view of the housing and a collector 800 along line G3-G3 of FIG. 31, and FIG. 35 is a cross-sectional view of the housing and the collector 800 along line G4-G4 of FIG. 31.

Referring to FIGS. 31 and 34, in a state in which each of the first collector 810 and the second collector 820 is seated on the third protrusion 720, the fifth protrusion 750 is disposed between the first collector 810 and the second collector 820 in a radial direction. An outer circumferential surface of the fifth protrusion 750 is in contact with an inner circumferential surface of the first collector 810, and an inner circumferential surface of the fifth protrusion 750 is in contact with an outer circumferential surface of the second collector 820 so that a gap between the first collector 810 and the second collector 820 is physically maintained.

Referring to FIGS. 31 and 35, when the protrusions 814 and 824 are disposed in the groove portions 710, the protrusions 814 and 824 may be positioned inside the third protrusion 720 without being exposed to the outside. Since the third protrusion 720 completely covers the protrusions 814 and 824, the collector 800 can be more firmly fixed to the housing.

Such a relative structure of the housing 700 and the collector 800 may be a structure that may be implemented in a process in which the housing 700 and the collector 800 are insert-molded and integrally formed. Since the housing 700 and the collector 800 are integrally formed, there is an advantage that a fusion structure or a fusion process for fixing the collector 800 to the housing 700 is unnecessary. In particular, since there is no risk of damage to a fusion portion, a fatal problem in that the collector 800 is separated from the housing 700 can be fundamentally eliminated.

FIG. 36 is a view illustrating the first gear and the second gear which are engaged with the main gear.

Referring to FIG. 36, sub-gears engaged with the main gear 120a include the first gear 10 and the second gear 20. The main gear 120a, the first gear 10, the second gear 20, and a second sensor 610 are for measuring an angle of a steering shaft.

The main gear 120a, the first gear 10, and the second gear 20 rotate by being engaged with each other. The main gear 120a is disposed on the outer circumferential surface of the stator body 120. The first gear 10 and the second gear 20 are rotatably disposed in the housing 700. A gear ratio of each of the main gear 120a, the first gear 10, and the second gear 20 is predetermined. For example, in a case in which the total angle of the main gear 120a is 1620°, when the main gear 120a rotates 4.5 revolutions, the first gear 10 may be designed to rotate 15.6 revolutions, and the second gear 20 may be designed to rotate 14.625 revolutions. Here, the total angle is an angle calculated by accumulating revolutions of the main gear 120a when all gears return to a state immediately before rotation.

Magnets may be disposed on the first gear 10 and the second gear 20. The magnet is disposed to face the second sensor 610.

FIG. 37 is a view illustrating a stator of a sensing device according to a second embodiment.

Referring to FIG. 37, a stator 1000 of the sensing device according to the second embodiment may include a stator holder 1110, a stator body 1120, a first stator tooth 1130, and a second stator tooth 1140. Hereinafter, only components different from those of the sensing device according to the first embodiment will be described, and descriptions of the same components will be omitted.

The first stator tooth 1130 and the second stator tooth 1140 may be disposed apart from each other in a radial direction. The first stator tooth 1130 and the second stator tooth 1140 may be fixed to the stator body 1120. The first stator tooth 1130 includes a first body 1131, first teeth 1132, a third tooth 1133, and an extension portion 1134. The second stator tooth 1140 includes a second body 1141 and a second tooth 1142.

The stator holder 1110 may be coupled to the stator body 1120.

A plurality of protrusions 1135 may be disposed on the first body 1131. The protrusion 1135 may protrude outward from the first body 1131. The protrusion 1135 is disposed to overlap the stator body 1120 in a circumferential direction with respect to a center of the stator 1000. The protrusion 1135 may increase a coupling force by increasing a contact area with the stator body 1120 and can prevent a slip between the stator body 1120 and the first body 1131.

FIG. 38 is a perspective view illustrating a first collector, and FIG. 39 is a perspective view illustrating a second collector.

Referring to FIGS. 38 and 39, a collector 1800 may include a first collector 1810 and a second collector 1820. Each of the first collector 1810 and the second collector 1820 collects a flux of the stator 1000. The first collector 1810 and the second collector 1820 may be formed of a metal material. The first collector 1810 and the second collector 1820 are disposed apart from each other in the radial direction about the same center as a center C of the stator 1000. Each of the first collector 1810 and the second collector 1820 may be a ring-shaped member.

FIG. 40 is a view illustrating the stator 1000, FIG. 41 is a cross-sectional view along line A-A, and FIG. 42 is a cross-sectional view along line B-B.

Referring to FIGS. 40 to 42, the stator body 1120 may include an inner portion 1122, an outer portion 1121, and a diaphragm 1123. The inner portion 1122 and the outer portion 1121 have a cylindrical shape. The outer portion 1121 is disposed outside the inner portion 1122 to be spaced apart from the inner portion 121 in the radial direction. The diaphragm 1123 connects the inner portion 1122 and the outer portion 1121. The inner portion 1122, the outer portion 1121, and the diaphragm 1123 may be integrated. The stator holder 1110 may be coupled to an inner side of the inner portion 1122. A space S may be formed between the outer portion 1121 and the inner portion 1122. The diaphragm 1123 may be formed in a plate shape. The diaphragm 1123 may be disposed between the inner portion 1122 and the outer portion 1121.

The space S may be divided into a first space S1 and a second space S2 by the diaphragm 1123. A first sensor 1500 may be disposed in the first space S1, and a magnet 1230 may be disposed in the second space S2. The diaphragm 1123 may be disposed below a virtual horizontal line. Here, the virtual horizontal line passes through a center of the outer portion 1121 with respect to an axial direction.

The first body 1131 and the second body 1141 may be disposed in the first space S1. The first tooth 1132 and the second tooth 1142 may be disposed in the second space S2.

The first stator tooth 1130 and the second stator tooth 1140 may be disposed between an outer circumferential surface of the inner portion 1122 of the stator body 1120 and an inner circumferential surface of the outer portion 1121 thereof. Here, the first stator tooth 1130 and the second stator tooth 1140 may be formed of a metal material for charging through rotation of the magnet 1230.

The first tooth 1132 and the second tooth 1142 may be disposed to be exposed from the stator body 1120. For example, the first tooth 1132 may be disposed to be exposed from the outer portion 1121. The first tooth 1132 may be disposed to form an overlap area O1 together with the outer portion 1121 in a circumferential direction with respect to a center of the stator 1000. The second tooth 1142 may be disposed to be exposed from the inner portion. The second tooth 1142 may be disposed to form an overlap area O2 together with the inner portion 1122 in the circumferential direction with respect to the center of the stator 1000.

The third tooth 1133 may also be disposed to be exposed from the stator body 1120. For example, the third tooth 1133 may be disposed to be exposed from the inner portion 1122. The third tooth 1133 may be disposed to form an overlap area O3 together with the inner portion 1122 in the circumferential direction with respect to the center of the stator 1000. The third tooth 1133 may also be disposed to be exposed from the inner portion 1122.

The extension portion 1134 may be disposed to be exposed from the stator body 1120. For example, the extension portion 1134 may be disposed to be exposed from the inner portion 1122. The extension portion 1134 may be disposed to overlap a diaphragm 1123 in the circumferential direction with respect to the center of the stator 1000. The extension portion 1134 may be disposed to be exposed from the diaphragm 1123.

Such a coupling structure of the stator body 1120 and the teeth 1130 and 1140 of the stator 1000 may be implemented by insert-molding and integrally forming the first stator tooth 1130, the second stator tooth 1140, and the stator body 1120. As described above, the reason why the first tooth 1132, the second tooth 1142, the third tooth 1133, and the extension portion 1134 are disposed to be exposed from the stator body 1120 so that an empty space is secured in the stator body 1120 is to allow the first tooth 1132, the second tooth 1142, the third tooth 1133, and the extension portion to face the magnet and is also to decrease injection pressure in an insert molding process to reduce deformation of the teeth 1130 and 1140 of the stator 1000 in the insert molding process.

FIG. 43 is a perspective view illustrating the stator body 1120, and FIG. 44 is a plan view of the stator body 1120.

Referring to FIG. 43, each of the outer portion 1121 and the inner portion 1122 of the stator body 1120 may include a plurality of first side portions K1. The first side portion K1 may be divided into a 1-1 side portion K1 and a 1-2 side portion K12. The 1-1 side portion K11 is a member constituting the outer portion 1121, and the 1-2 side portion K12 is a member constituting the inner portion 1122.

A plurality of 1-1 side portions K11 are disposed at intervals in the circumferential direction with respect to the center of the stator 1000 to form spaces A1 between adjacent 1-1 side portions K11. The first tooth 1132 may be disposed in the space A1. The 1-1 side portion K11 is in contact with a side surface of the first tooth 1132.

A plurality of 1-2 side portions K12 are disposed at intervals in the circumferential direction with respect to the center of the stator 1000 to form spaces A2 and A3 between adjacent 1-2 side portions K12. The second tooth 1142 and the third tooth 1133 may be disposed in the spaces A2 and A3. The 1-2 side portion K12 is in contact with a side surface of the second tooth 1142. The 1-2 side portion K12 is in contact with a side surface of the third tooth 1133.

Meanwhile, the stator body 1120 may include a plurality of second side portions K2. The second side portion K2 is in contact with the first body 1131. For example, an inner surface of the second side portion K2 may be in contact with an outer circumferential surface of the first body 1131. The plurality of second side portions K2 are disposed at intervals in the circumferential direction with respect to the center of the stator 1000 to form spaces A4 between adjacent second side portions K2. A portion of the first body 1131 is exposed to the outside form the space A4. The space A4 plays a large role in reducing injection pressure in an insert molding process of the first stator tooth 1130, the second stator tooth 1140, and the stator body 1120.

The stator body 1120 may include a third side portion K3 connecting the plurality of second side portions K2. The third side portion K3 may be in contact with the outer circumferential surface of the first body 1131.

Referring to FIG. 44, the diaphragm 1123 of the stator body 1120 may include a plurality of walls X1. The plurality of walls X1 are disposed at intervals in the circumferential direction with respect to the center of the stator 1000, and the extension portions 1134 are disposed between the adjacent walls X1 to be in contact with the walls X1.

FIG. 45 is a view illustrating a first contact surface N1 and a second contact surface N2 of the outer portion 1121 of the stator body 1120.

Referring to FIG. 45, the outer portion 1121 of the stator body 1120 may include the first contact surface N1 and the second contact surface N2. The first contact surface N1 is one surface of the outer portion 1121 in contact with one side surface of the first tooth 1132. The second contact surface N2 is the other surface of the outer portion 1121 in contact with the other side surface of the first tooth 1132. Each of the first contact surface N1 and the second contact surface N2 is an inclined surface. A circumferential width Q1 between the first contact surface N1 and the second contact surface N2 is formed to gradually decrease toward ends of the first contact surface N1 and the second contact surface N2 in the axial direction. This is for corresponding to a tapered end shape of the first tooth 1132.

FIG. 46 is a view illustrating a third contact surface N3 and a fourth contact surface N4 of the inner portion 1122 of the stator body 1120.

Referring to FIG. 46, the inner portion 1122 of the stator body 1120 may include the third contact surface N3 and the fourth contact surface N4. The third contact surface N3 is one surface of the inner portion 1122 in contact with one side surface of the third tooth 1133. The fourth contact surface N4 is the other surface of the inner portion 1122 in contact with the other side surface of the second tooth 1142. Each of the third contact surface N3 and the fourth contact surface N4 is an inclined surface. A circumferential width Q2 between the third contact surface N3 and the fourth contact surface N4 is formed to gradually decrease toward an end of the third contact surface N3 and the fourth contact surface N4 in the axial direction. This is for corresponding to a tapered end shape of the second tooth 1142.

The first contact surface N1, the second contact surface N2, the third contact surface N3, and the fourth contact surface N4 serve to prevent the stator teeth 1130 and 1140 from being separated from the stator body 1120 in the axial direction.

Such a coupling structure of the stator body 1120 and the teeth 1130 and 1140 may also be implemented by insert-molding and integrally forming the first stator tooth 1130, the second stator tooth 1140, and the stator body 1120. As described above, the first side portion K1, the second side portion K2, the third side portion K3, and the wall each secure the space A1 in the stator body 1120 to reduce injection pressure in an insert molding process and reduce deformation of the stator teeth 1130 and 1140 in the insert molding process.

Since the positions of the first tooth 1132, the second tooth 1142, and the third tooth 1133 are very important factors for the performance of a sensor device, dimensional management affecting the positions of the stator teeth 1130 and 1140 should be performed very precisely. As described above, when the stator teeth 1130 and 1140 are coupled to the stator body 1120 through molding, there is an advantage in that dimension management based on the stator teeth 1130 and 1140 is very easy.

In addition, since there is no need for a separate fusion structure or fusion process for coupling the stator teeth 1130 and 1140 to the stator body 1120, there is an advantage in that the flow or separation of the stator teeth 1130 and 1140 due to damage to a fusion structure is fundamentally removed, and there are advantages in that a manufacturing process is simplified and equipment for fusion is unnecessary.

FIG. 47 is a view illustrating directionality of an external magnetic field with respect to stator teeth 130 and 140, and FIG. 48 is a view illustrating an avoidance state of a first sensor 500 with respect to an external magnetic field having z-axis directionality.

Referring to FIG. 47, the external magnetic field significantly affects a sensing device in a y'-axis direction perpendicular to a z-axis direction which is an axial direction.

Referring to FIG. 48, the first sensor 500 of the sensing device according to the embodiment is disposed in a state of being erected in the z-axis direction. Therefore, an area of the first sensor 500 viewed in the z-axis direction is much smaller than an area of the first sensor 500 viewed in the y'-axis direction. Therefore, the sensing device according to the embodiment has an advantage in that an influence of an external magnetic field on the first sensor 500 is inevitably small in the z-axis direction.

Referring to FIGS. 25 and 47, in consideration of a state in which the first sensor 500 is erected in the z-axis direction, an external magnetic field in the y'-axis direction may significantly affect the first sensor 500. However, since the external magnetic field in the y'-axis direction is induced along a first stator tooth 130 and a second stator tooth 140, the external magnetic field flows without affecting the first sensor 500. Therefore, the sensing device according to the embodiment has an advantage in that an influence of an external magnetic field on the first sensor 500 is small even in the y'-axis direction.

FIG. 49 is a graph showing a comparison between changes in angle of Comparative Example and Example in response to an external magnetic field in a z-axis direction.

Referring to FIG. 49, Comparative Example relates to a sensing device having a structure in which stator teeth 130 and 140 are vertically disposed and a sensor 500 is disposed to lie down. As the external magnetic field in the z-axis direction increases, a change amount of an angle increases linearly, and thus it can be seen that a measurement angle significantly changes according to the external magnetic field.

On the other hand, in the case of Example, even when the external magnetic field in the z-axis direction increases, there is a little change in angle, and thus it can be seen that a sensing device is not affected by the external magnetic field.

FIG. 50 is a graph showing a comparison between changes in angle of Comparative Example and Example according to an external magnetic field in a y'-axis direction.

Referring to FIG. 50, Comparative Example relates to a sensing device having a structure in which first and second stator teeth 130 and 140 are vertically disposed and a sensor 500 is disposed to lie down. As the external magnetic field in the y'-axis direction increases, a change amount of an angle increases linearly, and thus it can be seen that a measurement angle significantly changes according to the external magnetic field.

On the other hand, in the case of Example, even when the external magnetic field in the y'-axis direction increases, there is a little change in angle, and thus it can be seen that a sensing device is not affected by the external magnetic field.

The present invention can be applied to various devices such as vehicles or home appliances.

The invention claimed is:

1. A sensing device comprising:
a stator including a stator tooth;
a rotor including a magnet; and
a housing,
wherein:
    the stator tooth includes a first stator tooth and a second stator tooth disposed inside the first stator tooth;
    the sensing device further includes a first sensor and a collector disposed between the first stator tooth and the second stator tooth in the radial direction;
    the collector includes a first collector and a second collector;

the first collector and the second collector are disposed to face each other in the radial direction;

the collector and the housing are integrally formed;

each of the first collector and the second collector includes a body disposed to face the first sensor and an extension portion extending from the body; and the extension portion includes a protrusion protruding from one side edge of the extension portion in an axial direction.

2. The sensing device of claim 1, wherein the housing includes a groove portion in which the protrusion is disposed.

3. The sensing device of claim 1, wherein:

the protrusion includes a first protrusion protruding from the extension portion and a second protrusion extending from the first protrusion; and a circumferential width of the second protrusion is greater than a circumferential width of the first protrusion.

4. The sensing device of claim 1, wherein:

the housing includes a third protrusion;

the third protrusion is disposed to overlap the first collector and the second collector in the axial direction; and the groove portion is disposed in the third protrusion.

5. The sensing device of claim 1, wherein the protrusion forms a locking structure with the housing in the axial direction during the process of being integrally formed with the collector and the housing.

6. The sensing device of claim 3, wherein the groove portion includes:

a first groove in which the first protrusion is disposed; and a second groove which extends from the first groove and in which the second protrusion is disposed.

7. A sensing device comprising:

a stator; and a rotor disposed in the stator, wherein the stator includes a stator holder, a stator body coupled to the stator holder, and a stator tooth disposed in the stator body; wherein the stator tooth includes a first stator tooth and a second stator tooth disposed inside the first stator tooth, and the first stator tooth and the second stator tooth are disposed to face each other in the radial direction; and wherein the first stator tooth, the second stator tooth, and the stator body are integrally formed.

8. The sensing device of claim 7, wherein:

the first stator tooth includes a first body and a plurality of first teeth;

the first teeth is disposed to protrude from the first body;

the first body is disposed to overlap the outer portion in the circumferential direction with respect to the center of the stator; and at least a portion of the first body is disposed to be exposed from the stator body.

9. The sensing device of claim 7, wherein:

the second stator tooth includes a second body, and a plurality of second teeth;

the second teeth is disposed to protrude from the second body;

the second body is disposed to overlap the inner portion in the circumferential direction with respect to the center of the stator; and at least a portion of the second body is disposed to be exposed from the stator body.

10. The sensing device of claim 7, wherein:

the stator body includes an outer portion and an inner portion disposed inside the outer portion;

the first stator tooth includes a plurality of first teeth;

the second stator tooth includes a plurality of second teeth;

each of the outer portion and the inner portion includes a plurality of first side portions;

the first side portions are disposed at intervals in the circumferential direction with respect to the center of the stator; and the first teeth and the second teeth are each disposed between the first side portions in the circumferential direction with respect to the center of the stator to be in contact with the first side portions.

11. The sensing device of claim 7, wherein the first stator tooth includes a plurality of first teeth and the second stator tooth includes a plurality of second teeth;

wherein the contact surfaces between the sides of the first teeth and the stator body, and between the side of the second teeth and the stator body, are each formed to be inclined so that the first teeth and the second teeth are engaged with the stator body in the axial direction.

12. The sensing device of claim 10, wherein:

the stator body includes a plurality of second side portions;

the second side portions are disposed at intervals in the circumferential direction with respect to the center of the stator;

the first stator tooth includes a first body;

the first teeth is disposed to protrude from the first body; and the first body is in contact with the second side portion.

* * * * *